(12) United States Patent
Imagawa

(10) Patent No.: US 7,906,920 B2
(45) Date of Patent: Mar. 15, 2011

(54) VIBRATION GENERATOR

(76) Inventor: Takahito Imagawa, Nagoya (JP)

( * ) Notice: Subject to any disclaimer, the term of this patent is extended or adjusted under 35 U.S.C. 154(b) by 627 days.

(21) Appl. No.: 11/965,367

(22) Filed: Dec. 27, 2007

(65) Prior Publication Data

US 2008/0211435 A1   Sep. 4, 2008

(30) Foreign Application Priority Data

Mar. 2, 2007   (JP) ................. 2007-094403

(51) Int. Cl.
*H02P 1/00* (2006.01)
*H02P 3/00* (2006.01)
(52) U.S. Cl. ..................... 318/130; 340/392.2
(58) Field of Classification Search .............. 318/130; 340/392.2
See application file for complete search history.

(56) References Cited

U.S. PATENT DOCUMENTS 1,283,388 A * 10/1918 Williams .................. 335/99
1,580,595 A * 4/1926 Gaynor et al. ............. 340/397.4

* cited by examiner

*Primary Examiner* — Bentsu Ro
*Assistant Examiner* — Erick Glass
(74) *Attorney, Agent, or Firm* — Craig Metcalf; Kirton & McConkie

(57) ABSTRACT

A vibration generator has an oscillator including a magnet and a holding member for holding the oscillator based on a magnetic force emitted from the oscillator. The holding member includes a magnet or a magnetic body. The oscillator vibrates relative to the holding member. A magnetic force between the oscillator and the holding member defines a natural period of vibration of the oscillator relative to the holding member. When a periodic current is supplied to an electromagnetic coil fixed to the holding member, the oscillator vibrates relative to the holding member so as to synchronize with the period of the periodic current. By synchronizing the period of the periodic current with a natural period, the oscillator resonates.

20 Claims, 12 Drawing Sheets

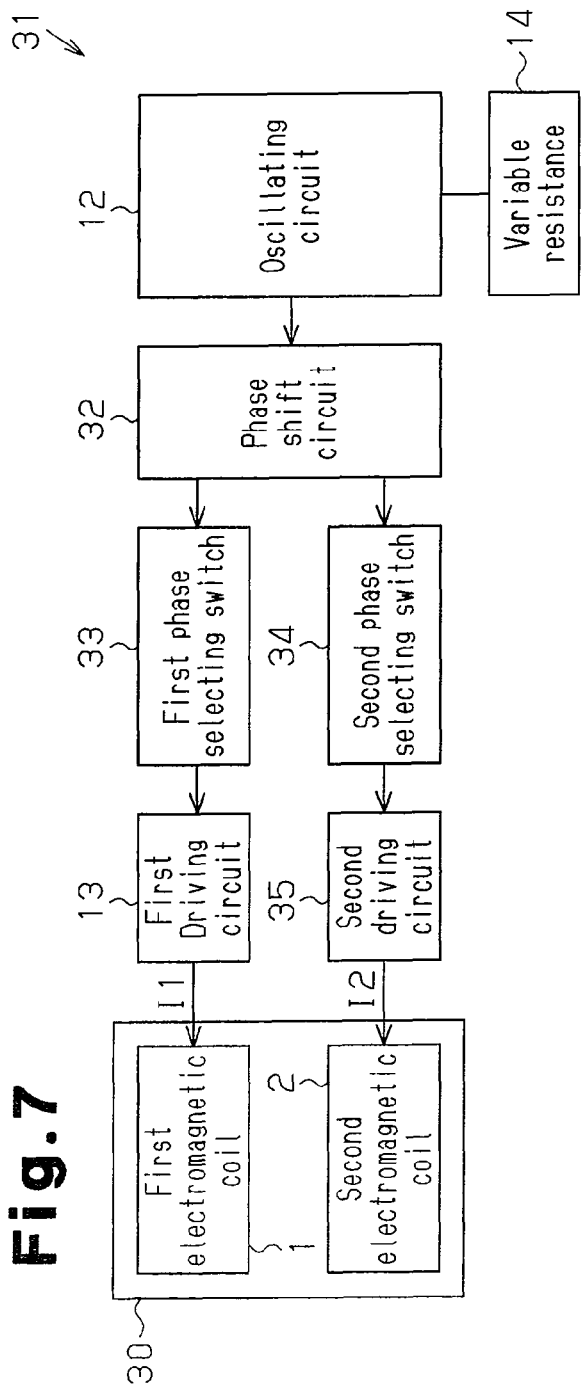

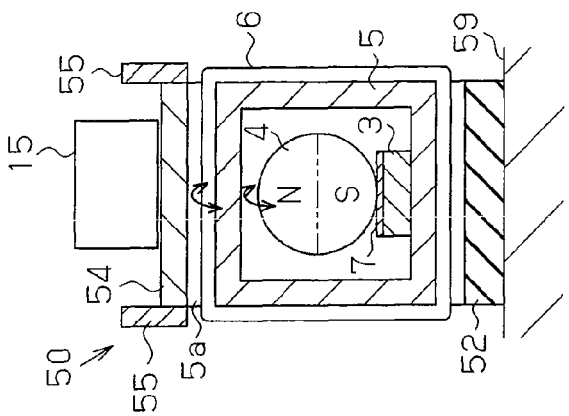
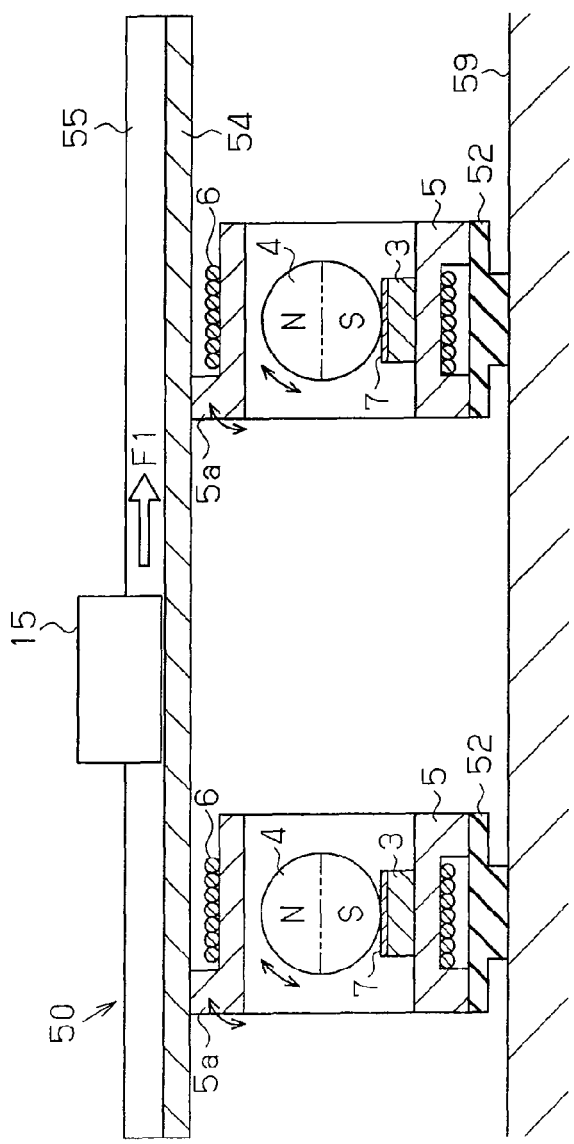

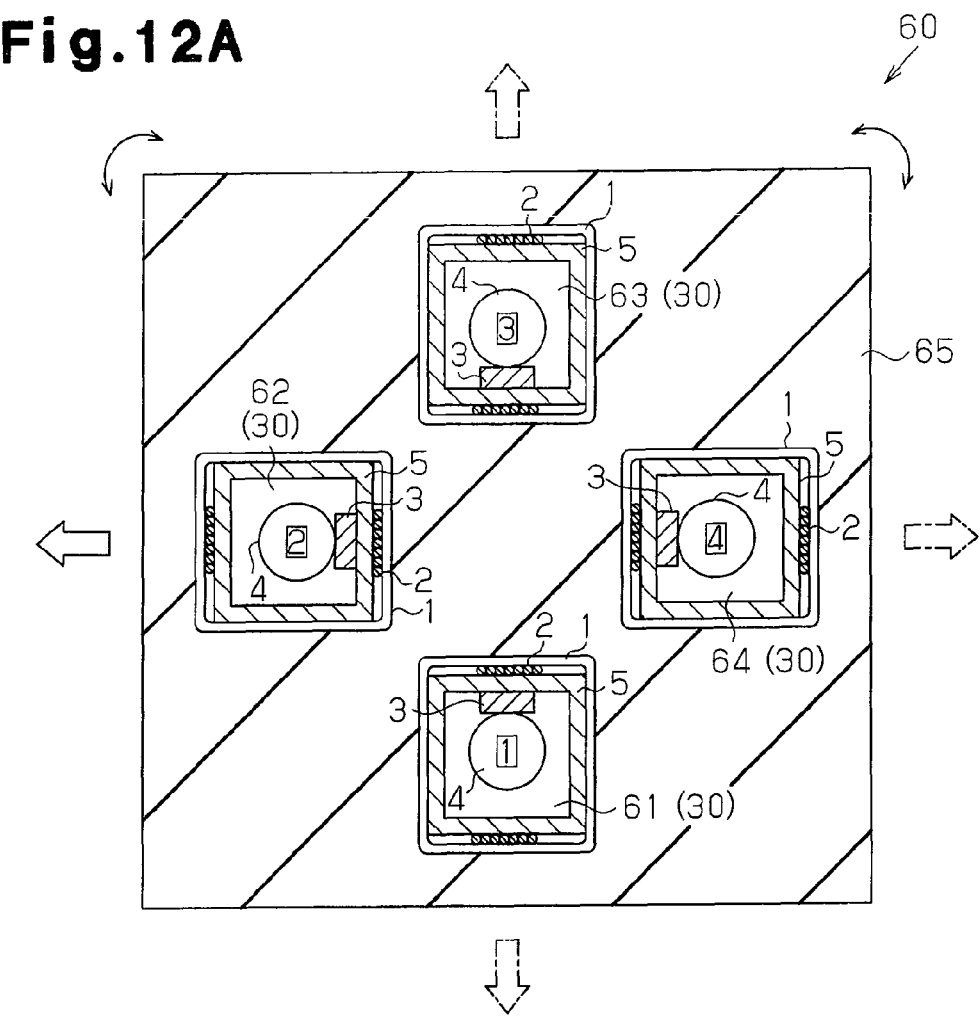
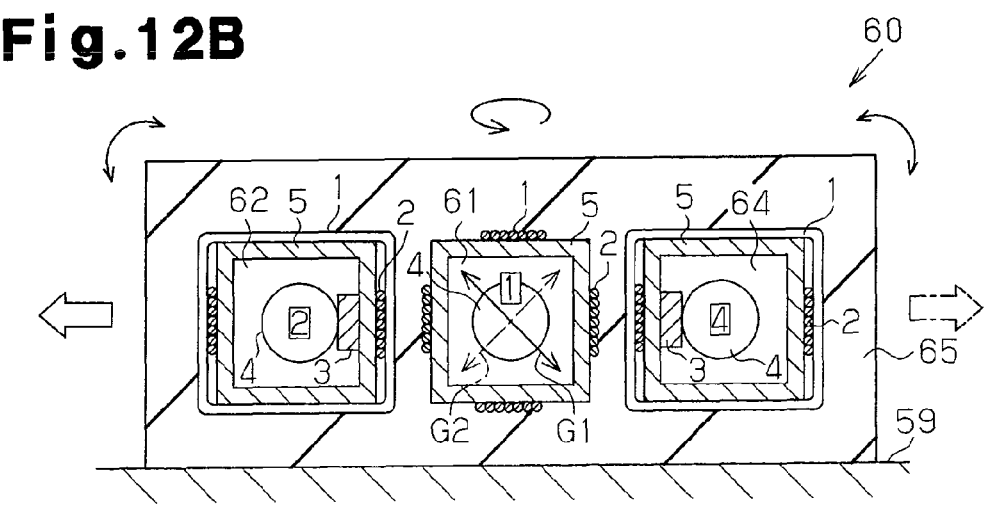

Fig. 13

| Control No. | No.11 | No.12 | No.13 | No.14 | No.15 | No.16 | No.17 | No.18 | No.19 | No.20 |
|---|---|---|---|---|---|---|---|---|---|---|
| 1 | ↗G1 | ↗ | off | off | ↗ | ↗ | ↗ | ↗ | ↗ | ↗ |
| 2 | off | off | ↗ | ↗ | ↗ | ↗ | ↗ | ↗ | ↗ | ↗ |
| 3 | ↗G2 | ↗ | off | off | ↗ | ↗ | ↗ | ↗ | ↗ | ↗ |
| 4 | off | off | ↗ | ↗ | ↗ | ↗ | ↗ | ↗ | ↗ | ↗ |
| Self-propelled/ rotated direction | ↓ | ↑ | ← | → | ↙ | ↘ | ↖ | ↗ | Clockwise ↻ | Counterclockwise ↺ |

VIBRATION GENERATOR

BACKGROUND ART

The present invention relates to a device for generating vibration by converting a current into vibration.

Generally, motors convert a current into rotational motion. When obtaining vibration by using such a motor, a mechanical conversion mechanism such as a cam and a crank is required.

To directly utilize rotation for vibration, there is a method of eccentrically attaching a weight to a rotary shaft. In this case, however, since the vibration thus obtained is vibration which rotates the position of the center of gravity of the weight and the rotary shaft as a whole, but is not vibration which has amplitude in a particular direction, the vibration is not suitable for motion such as flapping.

SUMMARY OF THE INVENTION

An objective of the present invention is to provide an improved vibration generator.

According to the present invention, a device capable of converting a current into vibration having amplitude and a rotational angle is provided. Thus, the vibration can be directly used for motion such as flapping. The device of the present invention can be used as a power source for generating vibration having amplitude in a particular direction. Furthermore, since the device of the present invention can control the direction and form of vibration, the device can be used as a power source capable of controlling the direction of motion.

In accordance with one aspect of the present invention, a vibration generator including an oscillator having a magnet and a holding member for holding the oscillator based on a magnetic force emitted from the oscillator is provided. The holding member includes a magnet or a magnetic body, and the oscillator can vibrate relative to the holding member. The magnetic force defines a natural period (characteristic period) of vibration of the oscillator relative to the holding member. When a periodic current is fed to an electromagnetic coil fixed to the holding member, the oscillator vibrates relative to the holding member in synchronization with the period of the periodic current. By synchronizing the period of the periodic current with the natural period, the oscillator is resonated.

Other aspects and advantages of the invention will become apparent from the following description, taken in conjunction with the accompanying drawings, illustrating by way of example the principles of the invention.

BRIEF DESCRIPTION OF DRAWINGS

The features of the present invention that are believed to be novel are set forth with particularity in the appended claims. The invention, together with objects and advantages thereof, may best be understood by reference to the following description of the presently preferred embodiments together with the accompanying drawings in which:

FIG. 7 is a block diagram of a two-dimensional manual control circuit for performing manual control of the two-dimensional vibration device in FIG. 6A;

FIG. 8 is a table showing a vibration control mode pattern of the two-dimensional vibration device in FIG. 6A;

FIGS. 10A and 10B are a cross-sectional front view and a cross-sectional side view of a linear transport apparatus in accordance with a fifth embodiment of the present invention;

FIGS. 12A and 12B are a cross-sectional plan view and a cross-sectional front view of an omnidirectional self-propelled apparatus in accordance with a seventh embodiment of the present invention;

FIG. 13 is a table showing a self-propelled mode pattern of the omnidirectional self-propelled apparatus in FIG. 12A;

DETAILED DESCRIPTION OF PREFERRED EMBODIMENTS

FIGS. 1A to 3 show a one-dimensional vibration device 10 in accordance with a first embodiment of the present invention. The one-dimensional vibration device 10 is a vibration generator which functions as a resonance motor vibrating in a one-dimensional direction when a periodic current is fed.

Figure 1A:
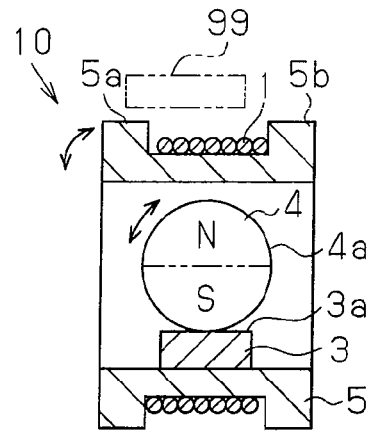
FIGS. 1A and 1B are a cross-sectional front view and a cross-sectional side view of a one-dimensional vibration device in accordance with a first embodiment of the present invention.

As shown in FIG. 1A, the one-dimensional vibration device 10 includes an electromagnetic coil 1, a holding member 3, an oscillator 4, and a housing 5. The housing 5 is shaped as a rectangular tube and accommodates the holding member 3 and the oscillator 4 therein. The electromagnetic coil 1 is wound around the outer surface of the housing 5. In detail, the electromagnetic coil 1 is accommodated in a groove formed around the housing 5. Of a pair of projections sandwiching the groove therebetween in FIG. 1A, the left upper projection is referred to as a first corner part 5a and the right upper projection is referred to as a second corner part 5b.

The holding member 3 is shaped like a flat plate fixed to the inner surface of the housing 5 and has a holding surface 3a opposed to the oscillator 4. Since both of the electromagnetic coil 1 and the holding member 3 are fixed to the housing 5, the electromagnetic coil 1 is fixed to the holding member 3. In this embodiment, the holding member 3 is disposed on the bottom of the housing 5 and the oscillator 4 is placed on the holding surface 3a. In this embodiment, the holding surface 3a is planar and the holding member 3 is an attracting portion formed of a magnet. The oscillator 4 is a spherical magnet and the surface of the oscillator 4 is a spherical surface as a vibrating surface 4a.

For example, when the vicinity of the holding surface 3a of the holding member 3 serves as a north pole, a lower hemisphere of the oscillator 4 becomes a south pole of the oscillator 4 and an upper hemisphere of the oscillator 4 becomes a north pole. That is, the holding member 3 and the oscillator 4 are attracted to each other due to a stationary magnetic field extending vertically. In other words, the holding member 3 holds the oscillator 4 by a magnetic force emitted from the oscillator 4. The shape of the housing 5 is not limited to a rectangular tube and may be cylindrical.

Figure 1B:
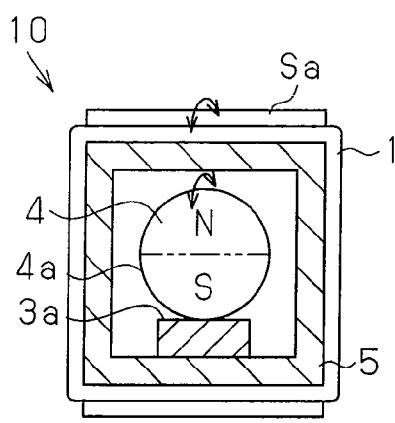

The oscillator 4 is a magnet which can be moved relative to the housing 5 and the holding member 3. The oscillator 4 and the holding member 3 are attracted to each other, so that the oscillator 4 contacts the holding surface 3a. When power supply to the electromagnetic coil 1 is stopped, as shown in FIGS. 1A and 1B, the oscillator 4 becomes stationary on the holding member 3 at a stable position. The oscillator 4 at the stable position is set to be located at the center of the holding member 3. The size, shape and material of the housing 5 are set such that even if the oscillator 4 moves relative to the holding member 3 with any portion of the oscillator 4 contacting the holding member 3, the housing 5 does not prevent the oscillator 4 from moving.

As shown in a chain line in FIG. 1A, the one-dimensional vibration device 10 may have a magnetic flux absorbing portion 99 placed on the electromagnetic coil 1. The magnetic flux absorbing portion 99 is formed of a magnet or a magnetic body. The magnetic flux absorbing portion 99 increases the magnetic force between the holding member 3 and the oscillator 4.

The electromagnetic coil 1 is formed such that a driving magnetic field generated from the electromagnetic coil 1 in the electrical supply state has a component perpendicular to the stationary magnetic field between the holding member 3 and the oscillator 4. In FIG. 1A, the driving magnetic field generated from the electromagnetic coil 1 in the electrical supply state acts in the horizontal direction.

Figure 2:
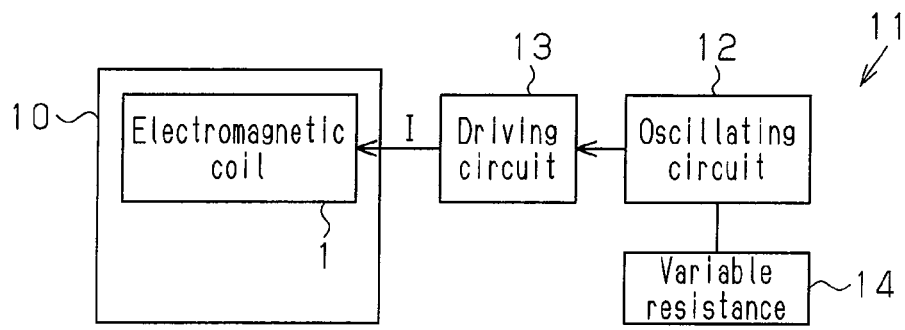
FIG. 2 is a block diagram of a one-dimensional manual control circuit for performing manual control of the one-dimensional vibration device in FIG. 1A.

FIG. 2 shows a one-dimensional manual control circuit 11 for performing manual control of the frequency, that is, manual control of the period of a driving current I as the periodic current fed to the electromagnetic coil 1. The one-dimensional manual control circuit 11 includes an oscillating circuit 12, a driving circuit 13, and a variable resistance 14. The oscillating circuit 12 outputs a basic current having basic frequency. When a resistance value of the variable resistance 14 is varied by a manual operation of the operator, the basic frequency of the oscillating circuit 12 varies. Based on the basic current of the oscillating circuit 12, the driving circuit 13 outputs the driving current I fed to the electromagnetic coil 1. Thus, the operator varies the resistance value of the variable resistance 14, thereby appropriately varying the frequency of the driving current I. In place of the variable resistance 14, a variable capacitor may be provided in the one-dimensional manual control circuit 11.

Next, operations of the one-dimensional vibration device 10 will be described.

In an initial state, the electromagnetic coil 1 is in a power supply stopped state, and as shown in FIGS. 1A and 1B, the oscillator 4 remains stationary at the stable position.

Figure 3A:
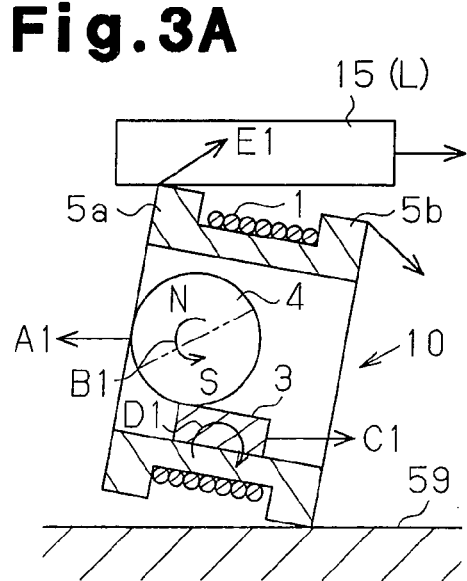
FIGS. 3A and 3B are each a cross-sectional view showing operations of the one-dimensional vibration device in FIG. 1A.
Figure 3B:
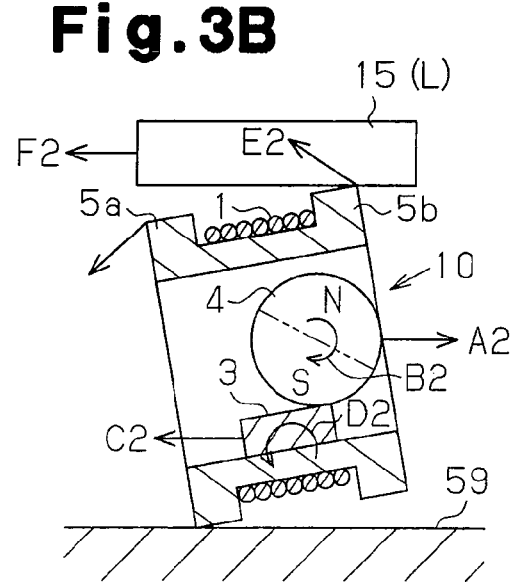

When power supply to the electromagnetic coil 1 is started from the initial state, the driving magnetic field is generated from the electromagnetic coil 1. As a result, as shown in FIGS. 3A and 3B, the oscillator 4 rotates and moves such that the north pole and the south pole of the oscillator 4 become aligned in the horizontal direction. FIGS. 3A and 3B show the state where the oscillator 4 is located at an end of the holding member 3. When power supply to the electromagnetic coil 1 is stopped in the state shown in FIGS. 3A and 3B, the oscillator 4 rotates and moves so as to return to the stable position shown in FIGS. 1A and 1B due to the stationary magnetic field acting between the holding member 3 and the oscillator 4. That is, the stationary magnetic field acting between the holding member 3 and the oscillator 4 serves as a restoring force for returning the oscillator 4 to the stable position, or the center of vibration.

Accordingly, when a pulse current as the periodic current is fed to the electromagnetic coil 1, since the switching on and off of the driving current I is frequently repeated, the oscillator 4 vibrates from side to side relative to the holding member 3 about the stable position of the oscillator 4 shown in FIGS. 1A and 1B.

The motion that the oscillator 4 vibrates slightly from side to side is vibration having natural period due to an attractive force of the magnetic field between the holding member 3 and the oscillator 4. By adjusting the driving current I fed to the electromagnetic coil 1 to, for example, the pulse current as the periodic current having a period corresponding to the natural period, the oscillator 4 is resonated, thereby generating vibration of large amplitude.

For example, when the period of the pulse current is sequentially varied, the oscillator 4 starts to exhibit large amplitude in the vicinity of the period at which resonance is generated. Using this phenomenon, the period of the pulse current is adjusted to a resonance period.

The holding member 3 in FIG. 1A is not necessarily formed of a magnet and only needs to be a magnetic body. When the oscillator 4 attracts the holding member 3, the stationary magnetic field having the magnetic flux extending in the vertical direction acts between the holding member 3 and the oscillator 4. That is, the holding member 3 holds the oscillator 4 by the magnetic force generated from the oscillator 4 made of the magnet. Thus, the driving magnetic field generated by the electromagnetic coil 1 acts on the stationary magnetic field, thereby obtaining resonance from the one-dimensional vibration device 10.

Since the holding member 3 has a reaction of the oscillator 4, when the oscillator 4 vibrates, the holding member 3 and the housing 5 also vibrate. That is, by supplying power to the electromagnetic coil 1, the whole one-dimensional vibration device 10 vibrates.

Describing in detail, by supplying power to the electromagnetic coil 1, the oscillator 4 and the holding member 3 move sideways and rotates relative to each other. Since the holding member 3 is fixed to the housing 5, when the holding member 3 moves sideways and rotates, the first corner part 5a as the left upper part of the housing 5 and the second corner part 5b of the right upper part of the housing 5 each vibrate in the form of an elliptic arc. The vibration in the form of an elliptic arc is characteristic of the vibration of the one-dimensional vibration device 10.

For example, as shown in FIGS. 3A and 3B, the case where the one-dimensional vibration device 10 is placed on a floor surface 59 as a reference surface and an article 15 to be transported is mounted on the top surface of the housing 5. In this case, the one-dimensional vibration device 10 can transport the article 15 in a direction of arrow F1 or arrow F2.

As shown in FIG. 3A, when the oscillator 4 moves to the left relative to the holding member 3, that is, in the direction of arrow A1, the oscillator 4 rotates on the holding member 3 in the counterclockwise direction represented by arrow B1. As a reaction to the motion of the oscillator 4, the holding member 3 acts to move to the right relative to the oscillator 4 as represented by arrow C1, and furthermore, acts to rotate relative to the oscillator 4 in the clockwise direction as represented by arrow D1. Since such motion of the holding member 3 is transmitted to the housing 5, the first corner part 5a as the left upper part of the housing 5 acts to move the article 15 diagonally to the upper right as represented by arrow E1. That is, the one-dimensional vibration device 10 acts to the article 15 to the right relative to the floor surface 59 as represented by arrow F1.

Conversely, as shown in FIG. 3B, when the oscillator 4 moves to the right relative to the holding member 3, that is, in the direction of arrow A2, the oscillator 4 rotates on the holding member 3 in the clockwise direction represented by arrow B2. As a reaction to the motion of the oscillator 4, the holding member 3 acts to move to the left relative to the oscillator 4 as represented by arrow C2, and furthermore, acts to rotate relative to the oscillator 4 in the counterclockwise direction as represented by arrow D2. Since such motion of the holding member 3 is transmitted to the housing 5, the second corner part 5b as the right upper part of the housing 5 acts to move the article 15 diagonally to the upper left as represented by arrow E2. That is, the one-dimensional vibration device 10 acts to the article 15 to the left relative to the floor surface 59 as represented by arrow F2.

Consequently, by selecting the transmission route of vibration from the housing 5 to the article 15 from the first corner part 5a or the second corner part 5b, it is possible to select transport of the article 15 in the direction of arrow F1 or transport of the article 15 in the direction of arrow F2. For example, a coefficient of friction of the surface of the first corner part 5a of the housing 5 is set to be different from that of the surface of the second corner part 5b of the housing 5. When the coefficient of friction of the surface of the first corner part 5a of the housing 5 is set to be larger than that of the surface of the second corner part 5b of the housing 5 so that the second corner part 5b slides with respect to the article 15, the one-dimensional vibration device 10 can transport the article 15 in the direction of arrow F1.

By mounting the article 15 on the housing 5, a vibration load L is applied to the housing 5. The ratio of the weight of the oscillator 4 to the sum of the weight of the housing 5 and the vibration load L has an effect on relative motion of the housing 5. As the weight of the oscillator 4 increases, the motion of the housing 5 becomes larger. As the vibration load L increases, the amplitude of the housing 5 becomes smaller, but the amplitude and vibration angle of the oscillator 4 become larger and resonance frequency lowers. When the vibration load L varies, to maintain resonance of the housing 5, it is required to appropriately vary current, that is, voltage. The fact that the driving current I of the one-dimensional vibration device 10 needs to be appropriately varied according to variation in the vibration load L is an advantageous feature in that efficient input control depending on the vibration load L is achieved.

The device for converting current into motion is generally an electromagnetic motor. In the one-dimensional vibration device 10, the electromagnetic coil 1 and the oscillator 4 correspond to the electromagnetic motor. The one-dimensional vibration device 10 in this embodiment provides a mechanism suitable for vibration by incorporating the attractive force between the holding member 3 and the oscillator 4 in an agent and obtaining resonance by use of the pulse current.

In this manner, the one-dimensional vibration device 10 can convert a current into vibration having amplitude and rotational angle. Thus, the one-dimensional vibration device 10 can directly convert the vibration into a motion like flapping of insects. The one-dimensional vibration device 10 can be also used as a power source for generating vibration having amplitude in a particular direction. Furthermore, the one-dimensional vibration device 10 can be used as a power source capable of controlling the direction of motion by controlling the direction of vibration.

In an experimental example of the one-dimensional vibration device 10, the housing 5 was of about 1 cm$^3$, and the holding member 3 and the oscillator 4 were each formed of a neodymium magnet. The oscillator 4 was shaped as a sphere of 6 mm in diameter. A pulse current of 100 mA at 5 V was used as the driving current I. As a result, resonance of the one-dimensional vibration device 10 had the following characteristics: the frequency was a few tens to a few hundreds cycles/second, the rotational angle was about 90 degrees, and the amplitude was about 5 mm. The resonance frequency was adjusted by changing the size of the magnet of the holding member 3.

The one-dimensional vibration device 10 shown in FIGS. 1A to 3 has the following advantages.

(1) The one-dimensional vibration device 10 having a size in centimeters or millimeters is accomplished. Being capable of generating vibration having large amplitude in spite of its compact size, the one-dimensional vibration device 10 can be applied to a compact power unit which performs vibrating or reciprocating motion by utilizing resonance state.

(2) The one-dimensional vibration device 10 shown in FIG. 1A has a mechanism in which the electromagnetic coil 1 and the holding member 3 are fixed to the housing 5 and the oscillator 4 is not fixed to the housing 5. According to variation in the magnetic field generated by the pulse current, the oscillator 4 vibrates so as to repeat horizontal movement with rotation. When resonated, the oscillator 4 vibrates more largely, thereby also vibrating the whole one-dimensional vibration device 10.

(3) The one-dimensional vibration device 10 in FIG. 1A has a simple structure without rotary shaft and thus, can be made compact.

(4) In the one-dimensional vibration device 10 in FIG. 1A, when the magnetic force from the electromagnetic coil 1 becomes too large, the oscillator 4 bounces out of the housing 5. Thus, a limit value of the pulse current is set so that the oscillator 4 does not bounce out of the housing 5. As compared with the case where the holding member 3 has no magnetism, the limit value of the pulse current can be set to be larger when the holding member 3 is a magnet.

(5) By designing the inner surface of the housing 5 so as to be close to the end of a movable range of the oscillator 4, the vibration efficiency of the one-dimensional vibration device 10 is improved.

(6) When the magnetic force between the holding member 3 and the oscillator 4 becomes larger, the frequency of proper vibration becomes higher, and thus, the one-dimensional vibration device 10 outputs vibration of high energy.

(7) As shown in FIG. 1A, the one-dimensional vibration device 10 may have the magnetic flux absorbing portion 99 placed on the electromagnetic coil 1. The magnetic flux absorbing portion 99 formed of a magnet or a magnetic body increases the magnetic force between the holding member 3 and the oscillator 4, and increases the frequency of proper vibration of the oscillator 4. That is, the magnetic flux absorbing portion 99 can adjust vibration of the one-dimensional vibration device 10 to vibration of high energy. In this manner, the one-dimensional vibration device 10 can easily adjust output and set output characteristics according to uses.

(8) The size of the housing 5 can be set so that the oscillator 4 under vibration hits against side walls of the housing 5 at each end of amplitude. In this case, the housing 5 is made of a material of high restitution coefficient. The oscillator 4 performs repetitive motion by reflecting on the side walls of the housing 5. The repetitive motion increases the resonance frequency of the oscillator 4. Thus, the vibration generator capable of strongly vibrating the housing 5 is obtained.

Figure 4:
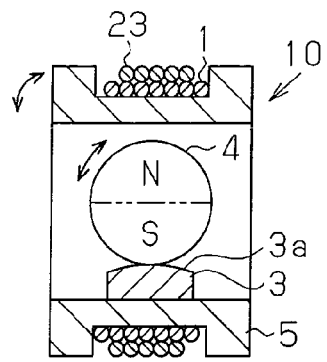
FIG. 4 is a cross-sectional view of a one-dimensional vibration device in accordance with a second embodiment of the present invention.
Figure 5:
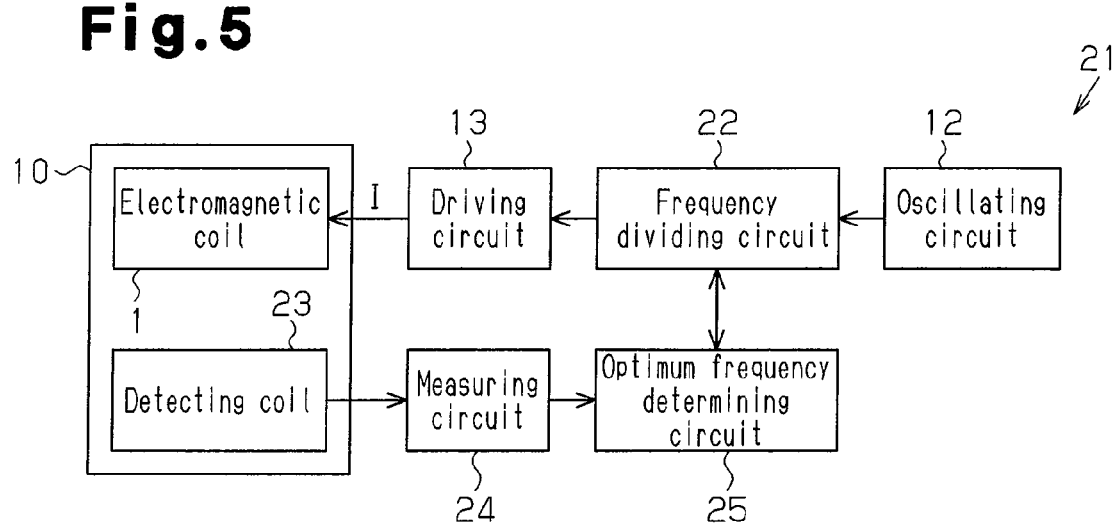
FIG. 5 is a block diagram of a one-dimensional autonomous control circuit for autonomously controlling the one-dimensional vibration device in FIG. 4.

FIGS. 4 and 5 show a second embodiment of the present invention. The second embodiment includes a one-dimensional autonomous control circuit 21 for autonomously controlling the frequency of the driving current I fed to the electromagnetic coil 1. To maintain resonance of the housing 5 according to variation in the vibration load L, the one-dimensional autonomous control circuit 21 controls to appropriately vary the frequency of the driving current I.

As shown in FIG. 5, the one-dimensional autonomous control circuit 21 includes the oscillating circuit 12, a frequency dividing circuit 22, the driving circuit 13, a detecting coil 23, a measuring circuit 24, and a frequency determining circuit 25. The frequency dividing circuit 22 divides the basic frequency of the basic current output from the oscillating circuit 12 by a number of division n, the number n being 2 or a greater integer. In other words, the basic frequency is multiplied by a number $\frac{1}{2}, \frac{1}{3}, \ldots, 1/n$. The number of division n is an integer of 2 or more.

FIG. 4 shows the detecting coil 23 wound around the electromagnetic coil 1. The detecting coil 23 detects vibration of the one-dimensional vibration device 10 and outputs a detecting signal to the measuring circuit 24. Describing in detail, the detecting coil 23 detects currents generated due to two kinds of electromagnetic induction. That is, the detecting coil 23 simultaneously detects an instantaneous current due to electromagnetic induction at the time of switching on/off of the pulse driving current I fed to the electromagnetic coil 1 and a sinusoidal current due to electromagnetic induction caused by the fact that the relative position of the oscillator 4 to the holding member 3 varies according to movement of the oscillator 4. Based on the transmitted detecting signal, the measuring circuit 24 measures the sinusoidal current and outputs the measurement result to the frequency determining circuit 25. That is, the detecting coil 23 and the measuring circuit 24 serve as measuring portions for measuring vibration of the oscillator 4 and generating the measurement result.

The frequency determining circuit 25 is an optimum frequency determining circuit for determining an optimum value of the number of division n for each unit time to determine an optimum frequency for resonating the one-dimensional vibration device 10. When the measurement result of the measuring circuit 24 is represented as frequency, the frequency determining circuit 25 determines a value of the number of division n such that the difference between driving frequency and measured frequency becomes minimized. When the measurement result of the measuring circuit 24 is represented as a voltage value or a current value, the frequency determining circuit 25 determines a value of the number of division n such that the measured voltage or measured current becomes maximized. That is, the one-dimensional autonomous control circuit 21 can perform feedback control of the number of division n such that the one-dimensional vibration device 10 may resonate as a whole.

As shown in FIG. 4, the holding surface 3a may be convex. In this case, since a magnetic pole concentrates on the top of the holding surface 3a, the oscillator 4 is easy to be stably located at the top of the convex surface. Furthermore, since the holding surface 3a is convex, the rotational angle of the oscillator 4 is easy to be made large.

FIGS. 6A to 8 show a third embodiment of the present invention. A two-dimensional vibration device 30 in the third embodiment is a vibration generator which can generate two-dimensional vibration.

Figure 6A:
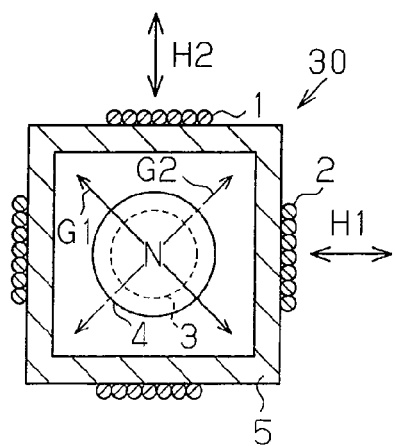
FIGS. 6A and 6B are a cross-sectional front view and a cross-sectional side view of a two-dimensional vibration device in accordance with a third embodiment of the present invention, respectively.
Figure 6B:
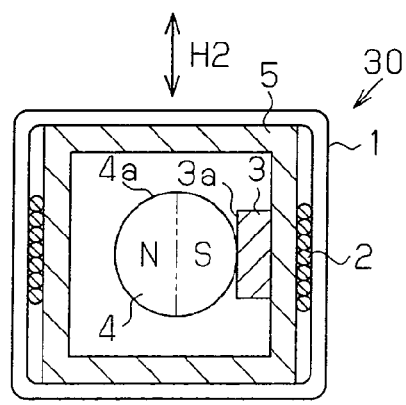

As shown in FIGS. 6A and 6B, the two-dimensional vibration device 30 includes a first electromagnetic coil 1, a second electromagnetic coil 2, the holding member 3, the oscillator 4, and the housing 5. That is, the two-dimensional vibration device 30 is a device formed by winding the second electromagnetic coil 2 around the one-dimensional vibration device 10 in FIG. 1A. The first electromagnetic coil 1 and the second electromagnetic coil 2 are wound around the housing 5 so as to be orthogonal to each other.

The holding member 3 is a disc-like magnet which is shaped like a thin cylinder. The holding member 3 in this embodiment is attached to a side wall of the housing 5.

The holding member 3 contacts the oscillator 4 inside the first electromagnetic coil 1 and the second electromagnetic coil 2 so as to attract each other. Conforming to the shape of the holding surface 3a and the vibrating surface 4a, the oscillator 4 can move in all of vertical and horizontal directions, keeping in contact with the holding member 3.

When both of the first electromagnetic coil 1 and the second electromagnetic coil 2 are in the power supply stopped state, the oscillator 4 becomes stationary at the stable position shown in FIGS. 6A and 6B.

FIG. 7 shows a two-dimensional manual control circuit 31 for performing manual control of the two-dimensional vibration device 30. The two-dimensional manual control circuit 31 includes the oscillating circuit 12, a phase shift circuit 32, a first phase selecting switch 33, a second phase selecting switch 34, a first driving circuit 13, a second driving circuit 35 and the variable resistance 14.

When receiving the basic current from the oscillating circuit 12, the phase shift circuit 32 outputs a plurality of phase signals each shifted from the basic frequency of the basic current. The first phase selecting switch 33 selects a first phase signal having the phase for driving the first electromagnetic coil 1 from the plurality of phase signals. Similarly, the second phase selecting switch 34 selects a second phase signal having the phase for driving the second electromagnetic coil 2 from the plurality of phase signals. Based on the first phase signal, the first driving circuit 13 outputs a first driving current I1 as a first periodic current for driving the first driving circuit 13. Based on the second phase signal, the second driving circuit 35 outputs a second driving current I2 as a second periodic current for driving the second electromagnetic coil 2. In this manner, the first phase selecting switch 33 and the first driving circuit 13 form a first driving portion for generating the first driving current I1 based on the first phase signal of the plurality of phase signals. The second phase selecting switch 34 and the second driving circuit 35 form a second driving portion for generating the second driving current I2 based on the second phase signal of the plurality of phase signals.

That is, the two-dimensional manual control circuit 31 can adjust a phase difference between the first driving current I1 and the second driving current I2 by adjusting a phase difference between the first phase selecting switch 33 and the second phase selecting switch 34. When the operator manually controls the resistance value of the variable resistance 14, the frequency of the first driving current I1 and the second driving current I2 is appropriately varied.

When the first driving current I1 is passed through the first electromagnetic coil 1, a first driving magnetic field H1 having the magnetic flux extending in the horizontal direction in FIG. 6A is generated. When the second driving current I2 is passed through the second electromagnetic coil 2, a second driving magnetic field H2 having the magnetic flux extending in the vertical direction in FIG. 6A is generated.

The first driving magnetic field H1 rotates and moves the oscillator 4 such that the north pole and the south pole of the oscillator 4 are aligned in the horizontal direction in FIG. 6A. The second driving magnetic field H2 rotates and moves the oscillator 4 such that the north pole and the south pole of the oscillator 4 are aligned in the vertical direction in FIG. 6A. That is, the first driving magnetic field H1 rotates the oscillator 4 to the right or the left in FIG. 6A relative to the stable position and the second driving magnetic field H2 rotates the oscillator 4 upwards or downwards in FIG. 6A relative to the stable position.

In this manner, the two-dimensional manual control circuit 31 selectively controls the first driving magnetic field H1 and the second driving magnetic field H2, thereby appropriately varying the vibration direction of the two-dimensional vibration device 30.

FIG. 8 is a table showing a vibration control pattern of the two-dimensional vibration device 30 and shows control modes No. 1 to No. 8. Hereinafter, the case where the period, or the frequency of the first driving current I1 is the same as that of second driving current I2 will be described.

The control mode No. 1 shows the case where the first driving current I1 is turned ON and the second driving current I2 is turned OFF. That is, the control mode No. 1 shows the case where the first driving magnetic field H1 is turned ON and the second driving magnetic field H2 is turned OFF. In this case, the oscillator 4 vibrates on the track of a straight line extending in the horizontal direction in FIG. 6A so as to go along the first driving magnetic field H1. That is, the vibration direction of the oscillator 4 is the horizontal direction in FIG. 6A. Conversely, the control mode No. 2 shows the case where the first driving magnetic field H1 is turned OFF and the second driving magnetic field H2 is turned ON, and the vibration direction of the oscillator 4 is vertical in FIG. 6A.

The control mode No. 3 shows the case both of the first driving current I1 and the second driving current I2 are turned ON and a phase difference between the first driving current I1 and the second driving current I2 is zero degree. In this case, for example, the oscillator 4 vibrates on the track of a straight line G2 extending diagonally to the right in FIG. 6A. By varying the ratio of the second driving current I2 to the first driving current I1 in magnitude, the vibration direction of the oscillator 4 can be varied within the range of 90 degrees. When the first driving current I1 has the same magnitude as the second driving current I2, the vibration direction of the oscillator 4 is 45 degrees up to the right. When the first driving current I1 is larger than the second driving current I2, the vibration direction of the oscillator 4 is close to the horizontal direction. When the first driving current I1 is smaller than the second driving current I2, the vibration direction of the oscillator 4 is close to the vertical direction.

The control mode No. 4 shows the case where both of the first driving current I1 and the second driving current I2 are turned ON and the phase difference between the first driving current I1 and the second driving current I2 is 180 degrees. That is, the phase difference between the first driving current I1 and the second driving current I2 is ½ period and the first driving current I1 and the second driving current I2 are in an opposite phase. In this case, the oscillator 4 vibrates on the track of the straight line G0 up to the left in FIG. 6A. By varying the magnitude of the first driving current I1 and the second driving current I2, the vibration direction of the oscillator 4 can be varied within the range of 90 degrees. That is, according to the control modes No. 1 to No. 4, the vibration direction of the oscillator 4 on the straight line can be varied in all two-dimensional directions of 360 degrees.

The control mode No. 5 shows the case where both of the first driving current I1 and the second driving current I2 are turned ON and the phase difference between the first driving current I1 and the second driving current I2 is 45 degrees, that is, ⅛ period. In this case, for example, the oscillator 4 vibrates on the track of an ellipse extending up to the right by 45 degrees in FIG. 6A. That is, the vibration direction of the oscillator 4 meets the ellipse inclined to the right in FIG. 6A. By adjusting the magnitude of the first driving current I1 and the second driving current I2, the direction of the ellipse can be appropriately varied.

The control mode No. 6 shows the case where both of the first driving current I1 and the second driving current I2 are turned ON, the first driving current I1 is the same as the second driving current I2 in magnitude, and the phase difference between the first driving current I1 and the second driving current I2 is 90 degrees, that is, ¼ period. In this case, the track of vibration of the oscillator 4 is circular.

The control mode No. 7 shows the case where both of the first driving current I1 and the second driving current I2 are turned ON, the ratio of the second driving current I2 to the first driving current I1 in magnitude is 50%, and the phase difference between the first driving current I1 and the second driving current I2 is 90 degrees, that is, ¼ period. In this case, the track of vibration of the oscillator 4 is an ellipse extending in the horizontal direction in FIG. 6A.

The control mode No. 8 shows the case where both of the first driving current I1 and the second driving current I2 are turned ON, the ratio of the first driving current I1 to the second driving current I2 is 50%, and the phase difference between the first driving current I1 and the second driving current I2 is 90 degrees, that is, ¼ period. In this case, the track of vibration of the oscillator 4 is an ellipse extending in the vertical direction in FIG. 6A.

In this manner, by controlling the phase difference between the first driving current I1 and the second driving current I2, the track of vibration of the oscillator 4 is circular or elliptic. Furthermore, the direction of the ellipse can be varied, thereby variously controlling the resonance mode of the oscillator 4.

In an experimental example of the two-dimensional vibration device 30, the housing 5 was about 1 $cm^3$, and the holding member 3 was formed of a disc-like neodymium magnet of 5 mm in diameter and 1 mm in thickness. The oscillator 4 was formed of a spherical neodymium magnet of 6 mm in diameter. By using a pulse current of 100 mA at about 5 V as the first driving current I1 and the second driving current I2, the two-dimensional vibration device 30 obtained resonance of about 100 cycles/second. Furthermore, the form and the direction of vibration of the two-dimensional vibration device 30 were controllable.

The two-dimensional vibration device 30 shown in FIGS. 6A to 8 has the following advantages.

(9) By controlling the magnitude and phase difference of the first driving current I1 and the second driving current I2, the two-dimensional vibration device 30 for generating resonance shaped as a straight line or an ellipse in any vibration direction is provided.

Generally, the vibration direction of the vibration device is constant, and when the vibration direction is varied, the orientation of the device itself needs to be varied. In such case, the form of vibration is determined depending on the characteristics of the device and thus, cannot be easily changed. However, the two-dimensional vibration device 30 in FIG. 6A can efficiently convert current into vibration, and furthermore, the form and the direction of vibration can be controlled by current.

(10) The mechanism of the two-dimensional vibration device 30 is simple and can be suitably miniaturized. The two-dimensional vibration device 30 can be constructed in a size of centimeters or millimeters. Accordingly, the two-dimensional vibration device 30 can be used for a compact power unit capable of performing directional control.

(11) By controlling the first driving current I1 and the second driving current I2, the occurrence, form, and direction of vibration of the two-dimensional vibration device 30 can be controlled. Accordingly, a movement control device without mechanical mechanism such as a rotary shaft or a gear is provided.

(12) By using the two-dimensional vibration device 30 as a vibration power source for a compact movable body moving by means of vibration, the two-dimensional vibration device 30 can also control the movement direction and can be used as a power source for an autonomous small-sized robot.

(13) When vibration of the two-dimensional vibration device 30 is used for transport of the article 15 to be transported, the transport direction can be also controlled. That is, the two-dimensional vibration device 30 serves as a power source obtained by integrating a compact transport apparatus and a directional control mechanism.

(14) The two-dimensional vibration device 30 can also control vibration waveform and vary the vibration waveform according to purposes of use.

(15) In transmitting power, elliptic vibration of the two-dimensional vibration device 30 can be effective. Generally, the method for obtaining elliptic vibration by controlling two vibration devices is performed. However, the two-dimensional vibration device 30 in this embodiment advantageously obtains elliptic vibration by itself.

(16) Depending on the shape of the holding surface 3a of the holding member 3 and the vibrating surface 4a of the oscillator 4, the characteristics of the movement direction of the oscillator 4 varies. That is, the shape of the holding surface 3a and the vibrating surface 4a relates to current circuit design for controlling the direction and form of vibration of the two-dimensional vibration device 30. When combination of the holding surface 3a and the vibrating surface 4a is a flat surface and a spherical surface or a spherical surface and a spherical surface, vibration characteristics which are constant in all directions can be obtained. Accordingly, performance of vibration control of the two-dimensional vibration device 30 is easy to become stable.

(17) The one-dimensional vibration device 10 in FIG. 1A and the two-dimensional vibration device 30 in FIG. 6A can also be utilized for the manner mode of a mobile phone and a vibration generator of an operating unit of a game console.

Since the two-dimensional vibration device 30 controls the direction and the form of vibration, the two-dimensional vibration device 30 can appropriately vary the direction of vibration and make the operator feel the variance. When the power supply is stopped, the one-dimensional vibration device 10 and the two-dimensional vibration device 30 can each resolve vibration in about 0.1 second. That is, rapidly reflecting the intention to generate or stop vibration, the one-dimensional vibration device 10 and the two-dimensional vibration device 30 can transmit the intention to the user of the mobile phone or the game console. That is, the one-dimensional vibration device 10 and the two-dimensional vibration device 30 are suitable for a force reactor.

Figure 9:
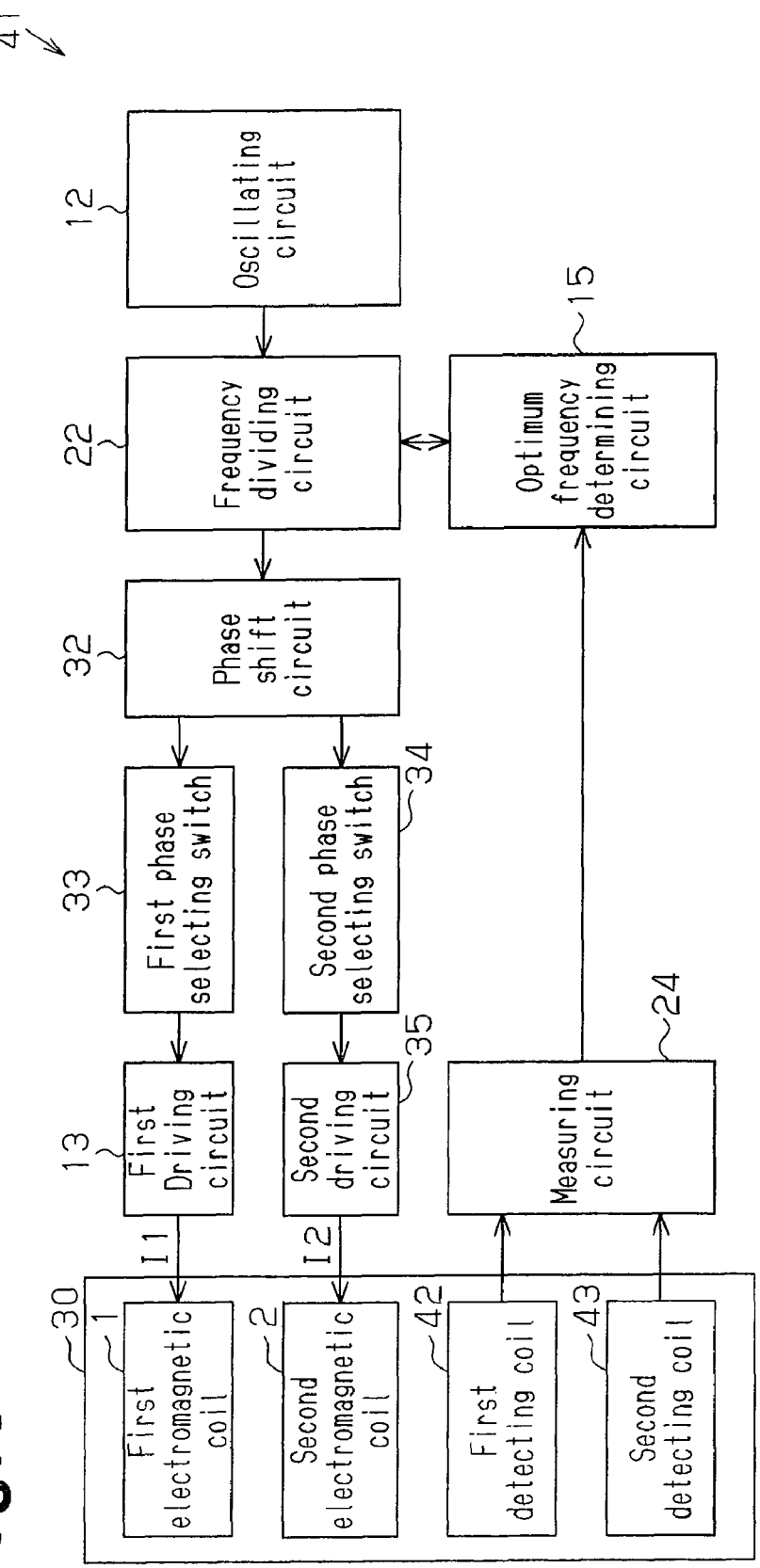
FIG. 9 shows a fourth embodiment of the present invention and is a block diagram of a two-dimensional autonomous control circuit for autonomously controlling the two-dimensional vibration device in FIG. 6A.

FIG. 9 shows a fourth embodiment of the present invention. The fourth embodiment includes a two-dimensional autonomous control circuit 41 for autonomously controlling the two-dimensional vibration device 30 in FIG. 6A. The two-dimensional autonomous control circuit 41 includes a first detecting coil 42 and a second detecting coil 43 which detect two-dimensional vibration of the two-dimensional vibration device 30. Furthermore, the two-dimensional autonomous control circuit 41 includes the oscillating circuit 12, the frequency dividing circuit 22, the phase shift circuit 32, the first phase selecting switch 33, the second phase selecting switch 34, the first driving circuit 13, the second driving circuit 35, the measuring circuit 24, and the frequency determining circuit 25. The measuring circuit 24 measures, for example, the frequency of actual two-dimensional vibration of the two-dimensional vibration device 30 from a detecting signal from the first detecting coil 42 and the second detecting coil 43. That is, the first detecting coil 42, the second detecting coil 43 and the measuring circuit 24 form a two-dimensional measuring portion for detecting vibration of the oscillator 4 in the two-dimensional direction and generating measurement result. To autonomously control resonance of the two-dimensional vibration device 30, the frequency determining circuit 25 determines the number of division n of the frequency dividing circuit 22 based on the measurement result of the measuring circuit 24 and the driving frequency of the oscillating circuit 12.

FIGS. 10A and 10B show a unidirectional linear transport apparatus 50 in accordance with a fifth embodiment of the present invention.

The unidirectional linear transport apparatus 50 transports the article 15 relative to the floor surface 59 as the reference surface in the one-dimensional direction. In this embodiment, the article 15 is transported by the unidirectional linear transport apparatus 50 along a straight line to the right in FIG. 10A. The unidirectional linear transport apparatus 50 includes a plurality of one-dimensional vibration devices 10, a plurality of legs 52, a transport plate 54, and a pair of guide plates 55.

Each one-dimensional vibration device 10 shown in FIG. 10A is obtained by removing the second corner part 5b from the one-dimensional vibration device 10 shown in FIG. 1A. Each leg 52 is an elastic body which supports the one-dimensional vibration device 10 on the floor surface 59 in a vibratable manner. By being fixed to the floor surface 59, each leg 52 supports the one-dimensional vibration device 10 on the floor surface 59 in a vibratable manner. A coating portion 7 is formed on the top surface of each holding member 3. The coating portion 7 prevents wear due to contact of the oscillator 4 against the holding member 3.

The transport plate 54 as a vibration plate is mounted on the first corner part 5a of each one-dimensional vibration device 10. The article 15 is mounted on the transport plate 54. The pair of guide plates 55 is disposed at both side edges of the transport plate 54, respectively. These guide plates 55 prevent the article 15 from falling from the transport plate 54. The leg 52 and the first corner part 5a are each made of, for example, rubber, sponge or urethane. The transport plate 54 is made of, for example, plastic, wood or metal.

Vibration of each one-dimensional vibration device 10 is transmitted to the transport plate 54 through the first corner part 5a and converted into a unidirectional carrier wave to the transport plate 54. That is, each first corner part 5a serves as a vibration converting portion for converting vibration of the one-dimensional vibration device 10 into the carrier wave of the transport plate 54. In the case shown in FIG. 10A, each first corner part 5a is located to the left of the oscillator 4 and the article 15 is transported to the right relative to the oscillator 4 in a transport direction F1. That is, the first corner part 5a which transmits vibration of each one-dimensional vibration device 10 to the transport plate 54 is located on the opposite side of each oscillator 4 with respect to the transport direction F1 of the article 15.

These one-dimensional vibration devices 10 are resonated by supplying the driving currents I of the same period and the same phase by the one-dimensional manual control circuit 11 shown in FIG. 2 or the one-dimensional autonomous control circuit 21 shown in FIG. 5. That is, when the oscillator 4 vibrates relative to the holding member 3, the holding member 3 and the housing 5 vibrate relative to the floor surface 59 due to reaction from the oscillator 4. The whole of each one-dimensional vibration device 10 vibrates in the one-dimensional direction and the one-dimensional vibration is converted into the carrier wave in the transport direction F1 by each first corner part 5a and the carrier wave is transmitted to the transport plate 54. As a result, the article 15 is transported in the transport direction F1.

The unidirectional linear transport apparatus 50 in FIGS. 10A and 10B has the following advantages.

(18) The unidirectional linear transport apparatus 50 is safer than general belt conveyors. For example, since the belt conveyor has members such as gears and rollers, an accident of being caught in the gears or the rollers can occur. On the contrary, since the unidirectional linear transport apparatus 50 only transmits vibration of the one-dimensional vibration device 10 to the transport plate 54, the above-mentioned accident cannot occur and thus, a breakdown hardly occurs.

(19) The unidirectional linear transport apparatus 50 has a good dustproof property. That is, since the unidirectional linear transport apparatus 50 has no mechanism such as gears and rollers, and each one-dimensional vibration device 10 can be sealed with an elastic enclosure, the environment surrounding the device can be kept clean. Accordingly, even when proper sanitary conditions are required at all time, the unidirectional linear transport apparatus 50 can transport the article 15.

(20) The unidirectional linear transport apparatus 50 has a good waterproof property. That is, by sealing the one-dimensional vibration device 10 with the elastic enclosure, the unidirectional linear transport apparatus 50 is easy to be designed as being waterproof. Accordingly, even when the article 15 is wet, the unidirectional linear transport apparatus 50 can transport the article 15 without any problem. In addition, even in a high humidity condition, the unidirectional linear transport apparatus 50 can be used without any problem.

(21) In an experimental example of the unidirectional linear transport apparatus 50, the unidirectional linear transport apparatus 50 in which the oscillator 4 was formed of a cylindrical neodymium magnet of 1.5 cm in diameter and 2 cm in length and which had two one-dimensional vibration device 10 was used. When receiving electric power of about 3 W, the unidirectional linear transport apparatus 50 transported the article 15 of 150 g at the transport speed of about 20 cm/second. Such unidirectional linear transport apparatus 50 can be used a part feeder.

(22) Although the conventional part feeder uses vibration as a power source, a spring or a vibration plate for amplifying vibration of the power source by resonance is provided on the outer side of a vibration generating mechanism. On the contrary, the one-dimensional vibration device 10 of the unidirectional linear transport apparatus 50 is a power source for generating vibration and also serves as a mechanism for amplifying vibration by resonance. For this reason, the unidirectional linear transport apparatus 50 is smaller and lighter than the conventional part feeder.

(23) As compared to the general belt conveyor, the unidirectional linear transport apparatus 50 can be maintained more easily. The gears and the rollers in the belt conveyor require adjustment of mechanical engagement and easily cause a breakdown. On the contrary, since the unidirectional linear transport apparatus 50 has simple configuration in which the leg 52, the one-dimensional vibration device 10, and the transport plate 54 are stacked on the floor surface 59 in this order, fine mechanical adjustment is not required and a breakdown hardly occurs.

Figure 11:
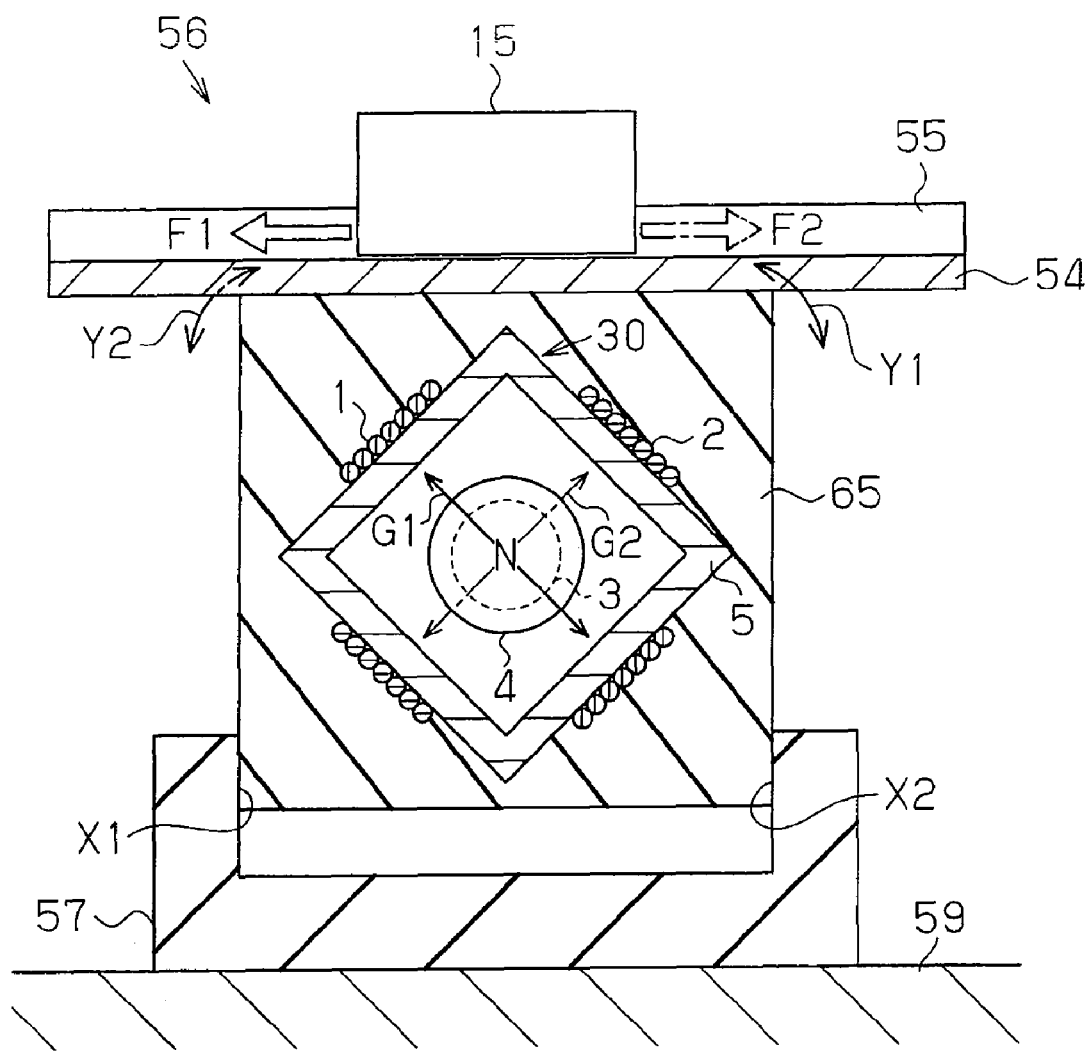
FIG. 11 is a front view of a bidirectional linear transport apparatus in accordance with a sixth embodiment of the present invention.

FIG. 11 shows a bidirectional linear transport apparatus 56 in accordance with a sixth embodiment of the present invention. The bidirectional linear transport apparatus 56 can transport an article 15 to be transported along one straight line in both directions with respect to the floor surface 59 as the reference surface. In this embodiment, the bidirectional linear transport apparatus 56 transports the article 15 in both directions of the straight line horizontally extending in FIG. 11. The bidirectional linear transport apparatus 56 includes the two-dimensional vibration device 30, an elastic enclosure 65, a leg 57 and the transport plate 54.

The elastic enclosure 65 is an elastic body for covering the two-dimensional vibration device 30 in FIG. 6A in a vibratable manner. The elastic enclosure 65 is made of, for example, rubber, sponge, urethane, or plastic. The leg 57 supports the elastic enclosure 65 with respect to the floor surface 59 in a vibratable manner. As a result, the leg 57 maintains a two-dimensional vibration characteristic of the two-dimensional vibration device 30 with respect to the floor surface 59. The two-dimensional vibration characteristic means that both of two different vibrations of different vibration directions which are shifted from each other by 90 degrees can be controlled. The holding member 3 of the two-dimensional vibration device 30 is disposed perpendicular to the floor surface 59 and along the transport direction.

For example, as shown in FIG. 11, the cross-section of the leg 57 is recessed and the leg 57 has a first contacting part X1 and a second contacting part X2 for lifting up the elastic enclosure 65 from left and right sides. The first contacting part X1 contacts a left lower part of the elastic enclosure 65 from the side. The second contacting part X2 contacts a right lower part of the elastic enclosure 65 from the side. The leg 57 is separated from the elastic enclosure 65 between the first contacting part X1 and the second contacting part X2.

A directional axis of a first vibration G1 and a directional axis of a second vibration G2, which are shifted from each other by 90 degrees and pass the center of the oscillator 4 at the stable position, are defined. The directional axis of the first vibration G1 and the directional axis of the second vibration G2 are inclined relative to the floor surface 59 and the transport direction. The first contacting part X1 is positioned on the extension of the directional axis of the second vibration G2 and the second contacting part X2 is positioned on the extension of the directional axis of the first vibration G1.

The two-dimensional vibration device 30 in FIG. 11 is resonated by the two-dimensional manual control circuit 31 in FIG. 7 or the two-dimensional autonomous control circuit 41 in FIG. 9. When the two-dimensional vibration device 30 generates the first vibration G1, the transport plate 54 performs first vibration Y1 about the first contacting part X1. When the two-dimensional vibration device 30 generates the second vibration G2, the transport plate 54 performs second vibration Y2 about the second contacting part X2. The first vibration Y1 transmits a force F1 to the article 15 on the transport plate 54, thereby transporting the article 15 to the left in FIG. 11. The second vibration Y2 transmits a force F2 to the article 15, thereby transporting the article 15 to the right in FIG. 11.

That is, since the two-dimensional vibration device 30 can selectively transmit the bidirectional forces F1 and F2 to the transport plate 54, the article 15 on the transport plate 54 can be selectively transported to the left or the right in FIG. 11.

The bidirectional linear transport apparatus 56 in FIG. 11 has the following advantages in addition to the advantages of the unidirectional linear transport apparatus 50 in FIG. 10A.

(24) The bidirectional linear transport apparatus 56 can control both forward movement and rearward movement of the article 15.

(25) By combining the first vibration G1 with the second vibration G2, the bidirectional linear transport apparatus 56 can vibrate in an elliptic manner. The bidirectional linear transport apparatus 56 vibrating in an elliptic manner can smoothly transport the article 15.

FIGS. 12A to 13 show an omnidirectional self-propelled apparatus 60 in accordance with a seventh embodiment of the present invention. The omnidirectional self-propelled apparatus 60 can run on the floor surface 59 in all directions. That is, the omnidirectional self-propelled apparatus 60 capable of freely running in the multiple directions can freely run in the two-dimensional way.

As shown in FIGS. 12A and 12B, the omnidirectional self-propelled apparatus 60 includes a first vibration device 61, a second vibration device 62, a third vibration device 63, and a fourth vibration device 64. These first to fourth vibration devices 61-64 are each the same as the two-dimensional vibration device 30 shown in FIG. 6A. The omnidirectional self-propelled apparatus 60 has a flat box-like elastic enclosure 65 for enclosing the first to fourth vibration devices 61-64 therein so that the devices can vibrate relative to the floor surface 59.

The first to fourth vibration devices 61-64 are disposed in four directions relative to the floor surface 59. In this embodiment, in a plan view of FIG. 12A, the first to fourth vibration devices 61-64 are arranged in clockwise direction in this order, the first vibration device 61 is located in the lower portion in FIG. 12A, the second vibration device 62 is located in the left portion in FIG. 12A, the third vibration device 63 is located in the upper portion in FIG. 12A and the fourth vibration device 64 is located in the right portion in FIG. 12A. For convenience, in FIGS. 12A to 12, the first to fourth vibration devices 61-64 are represented by "1" to "4", respectively, surrounded by a rectangular frame. The holding member 3 of each of the first to fourth vibration devices 61-64 is disposed perpendicular to the floor surface 59. That is, the holding member 3 and the oscillator 4 are aligned along the floor surface 59. The holding member 3 of each of the first to fourth vibration devices 61-64 is disposed so as to be closer to the center of the omnidirectional self-propelled apparatus 60 relative to the respective oscillator 4.

By selectively resonating the first to fourth vibration devices 61-64 by the two-dimensional manual control circuit 31 shown in FIG. 7 or the two-dimensional autonomous control circuit 41 shown in FIG. 9, the omnidirectional self-propelled apparatus 60 is self-propelled or rotated as shown by control modes No. 11 to No. 20 in FIG. 13.

For example, in the control mode No. 11, by diagonally vibrating the first vibration device 61 and the third vibration device 63 which are located to be opposed to each other along arrows representing different directions such as the first vibration G1 and the second vibration G2, respectively, the whole omnidirectional self-propelled apparatus 60 moves to the left in FIG. 12A while being lifted up from the floor surface 59. The second vibration device 62 and the fourth vibration device 64 are turned OFF. In the control mode No. 12, by vibrating the first vibration device 61 and the third vibration device 63 in an oblique direction (diagonal direction) different from the oblique direction as in the control mode No. 11, the omnidirectional self-propelled apparatus 60 moves to the right in FIG. 12A.

In the control mode No. 13, by turning OFF the first vibration device 61 and the third vibration device 63 and diagonally vibrating the second vibration device 62 and the fourth vibration device 64, the omnidirectional self-propelled apparatus 60 moves upwards in FIG. 12A. In the control mode No. 14, by vibrating the second vibration device 62 and the fourth vibration device 64 in an oblique direction different from the oblique direction as in the control mode No. 13, the omnidirectional self-propelled apparatus 60 moves downwards in FIG. 12A.

In the control mode No. 15, by combining the control mode No. 11 with the control mode No. 13 to vibrate all of the first to fourth vibration devices 61-64, the omnidirectional self-propelled apparatus 60 moves up to the left in FIG. 12A. In the control mode No. 16, by combining the control mode No. 11 with the control mode No. 14, the omnidirectional self-propelled apparatus 60 moves down to the left in FIG. 12A.

In the control mode No. 17, by combining the control mode No. 12 with the control mode No. 13, the omnidirectional self-propelled apparatus 60 moves up to the right in FIG. 12A. In the control mode No. 18, by combining the control mode No. 12 with the control mode No. 14, the omnidirectional self-propelled apparatus 60 moves down to the right in FIG. 12A.

In the control mode No. 19, by vibrating all of the first to fourth vibration devices 61-64 in a common oblique direction, the omnidirectional self-propelled apparatus 60 rotates clockwise, that is, to the right in FIG. 12A. In the control mode No. 20, by vibrating all of the first to fourth vibration devices 61-64 in an oblique direction different from the oblique direction as in the control mode No. 19, the omnidirectional self-propelled apparatus 60 rotates counterclockwise, that is, to the left in FIG. 12A.

That is, in the control mode No. 11 to the control mode No. 14, the omnidirectional self-propelled apparatus 60 moves back and forth, from side to side, that is, in four directions relative to the floor surface 59. In the control modes No. 15 to No. 18, the omnidirectional self-propelled apparatus 60 moves in four oblique directions. In the control modes No. 19 and No. 20, the omnidirectional self-propelled apparatus 60 rotates by itself at the current position on the floor surface 59.

As compared to the self-propelled apparatus having a general motor, the omnidirectional self-propelled apparatus 60 in FIG. 12A has the following advantages.

(26) The omnidirectional self-propelled apparatus 60 can control running and rotation in all directions of 360 degrees relative to the floor surface 59 with its simple configuration.

Figure 14A:
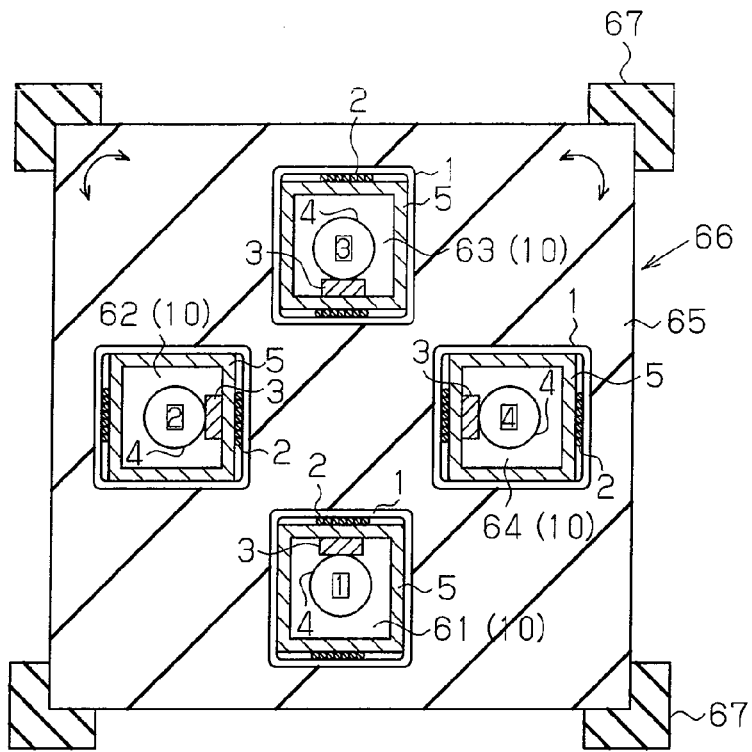
FIGS. 14A and 14B are a cross-sectional plan view and a cross-sectional front view of an omnidirectional transport apparatus in accordance with an eighth embodiment of the present invention.
Figure 14B:
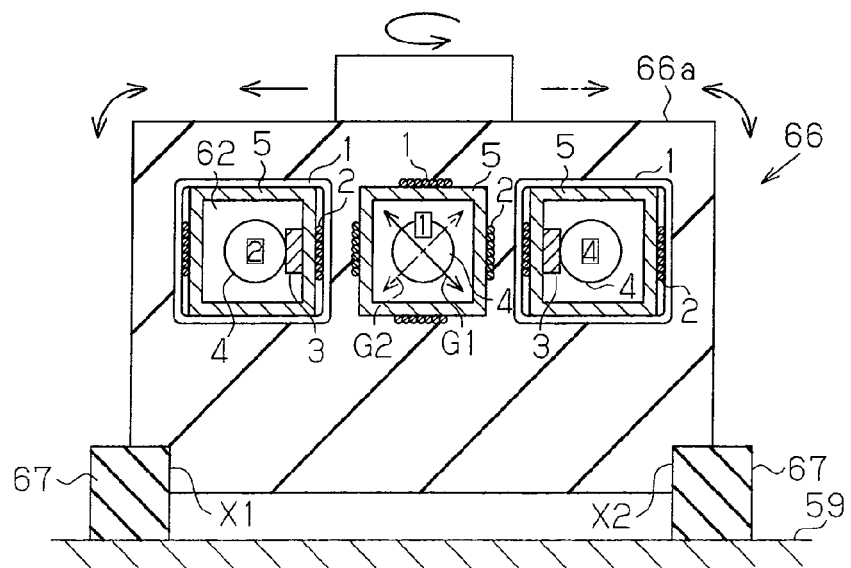

FIGS. 14A and 14B show an omnidirectional transport apparatus 66 in accordance with an eighth embodiment of the present invention.

The omnidirectional transport apparatus 66 has a plurality of legs 67 for fixing the omnidirectional self-propelled apparatus 60 in FIG. 12A to one place of the floor surface 59. The upper surface of the elastic enclosure 65 serves as a transport surface 66a. The omnidirectional transport apparatus 66 can transport an article 15 to be transported, which is mounted on the transport surface 66a, back and forth and from side to side. Furthermore, the omnidirectional transport apparatus 66 can rotate the article 15, that is, can cause the article 15 to rotate by itself, at the current position on the transport surface 66a, thereby varying the orientation of the article 15.

The legs 67 contact the omnidirectional self-propelled apparatus 60 such that the omnidirectional self-propelled apparatus 60 vibrates in all directions relative to the floor surface 59. For example, as shown in FIGS. 14A and 14B, the four legs 67 support four corners of the bottom surface of the elastic enclosure 65 to the floor surface 59 in a vibratable manner. As a result, the omnidirectional self-propelled apparatus 60 contacts the floor surface 59 so as to vibrate in all directions. The position of a contacting part X of each of the legs 57 and the omnidirectional self-propelled apparatus 60 is set on the extension directional axes of diagonal vibrations G1, G2 passing the center of the oscillator 4 at the stable position of the first vibration device 61 when the omnidirectional transport apparatus 66 is viewed in a front view of FIG. 14B. Like the omnidirectional self-propelled apparatus 60, the two-dimensional manual control circuit 31 in FIG. 7 or the two-dimensional autonomous control circuit 41 in FIG. 9 can control the omnidirectional transport apparatus 66 so as to transport or rotate the article 15 in all directions.

The omnidirectional transport apparatus 66 in FIG. 14A has the following advantages.

(27) The omnidirectional transport apparatus 66 has a simple configuration in transporting the article 15 in all directions and controlling the orientation of the article 15.

Figure 15A:
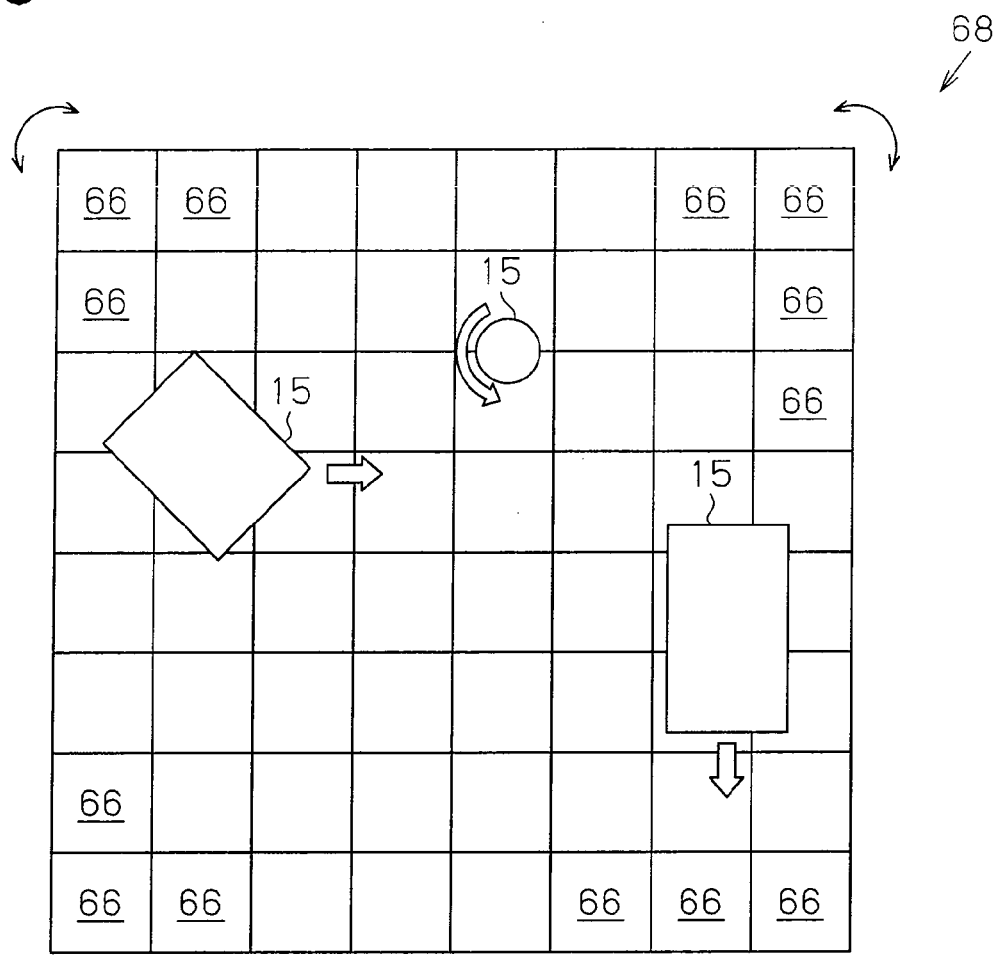
FIGS. 15A and 15B are a cross-sectional plan view and a cross-sectional side view of a collective omnidirectional transport apparatus in accordance with a ninth embodiment of the present invention.
Figure 15B:
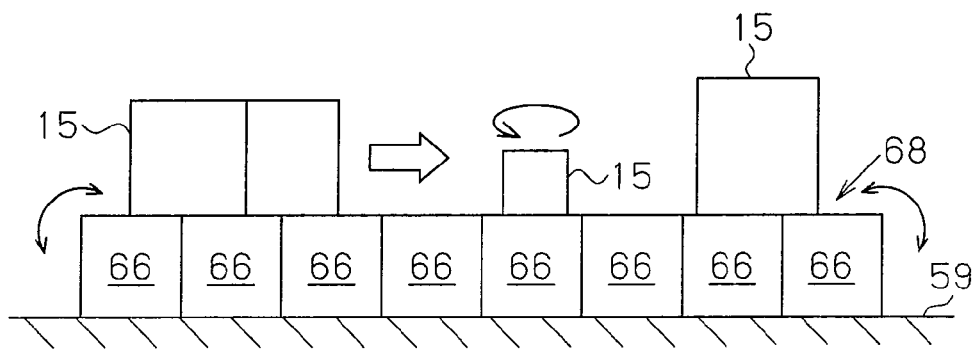

FIGS. 15A and 15B show a collective omnidirectional transport apparatus in accordance with a ninth embodiment of the present invention. The collective omnidirectional transport apparatus 68 is formed of a lot of omnidirectional transport apparatuses 66 in FIG. 14A arranged on the floor surface 59 in a matrix.

The collective omnidirectional transport apparatus 68 can transport a plurality of articles 15 to be transported simultaneously through respective transport routes. The collective omnidirectional transport apparatus 68 can rotate, that is, cause to rotate each of the articles 15 at the current position to turn its orientation. That is, the collective omnidirectional transport apparatus 68 can transport the plurality of articles 15 simultaneously through respective transport routes and assort the plurality of articles 15. In FIG. 15B, the legs 57 are not shown.

The collective omnidirectional transport apparatus 68 in FIG. 15A has the following advantages.

(28) The collective omnidirectional transport apparatus 68 can assort and transport a plurality of articles 15 simultaneously through respective transport routes with a simple configuration.

(29) The collective omnidirectional transport apparatus 68 can control the orientation of each article 15 simultaneously.

Figure 16:
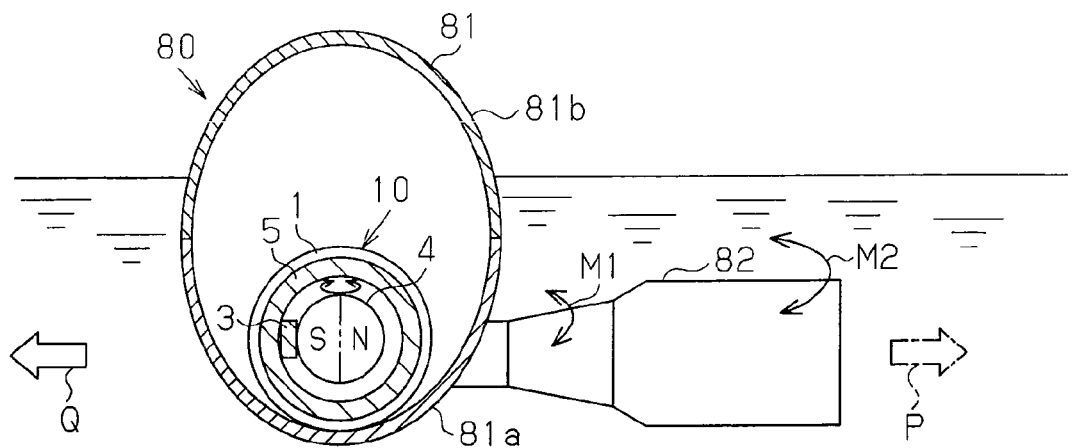
FIG. 16 is a cross-sectional side view of a water stream generator in accordance with a tenth embodiment of the present invention.

FIG. 16 shows a water stream generator 80 in accordance with a tenth embodiment of the present invention. The water stream generator 80 can be driven forward in water by generating a water stream while floating on water.

As shown in FIG. 16, the water stream generator 80 has the one-dimensional vibration device 10, a container 81, and a vibrating fin 82. The container 81 seals the one-dimensional vibration device 10 and protects the one-dimensional vibration device 10 against water. Although the one-dimensional vibration device 10 has the cylindrical housing 5, the oscillator 4 and the holding member 3 are the same as those in FIG. 1A. The holding member 3 is fixed to the housing 5, and the housing 5 is fixed to the container 81. The holding member 3 is disposed perpendicular to a draft plane and on the side of the movement direction of the water stream generator 80 relative to the oscillator 4.

One vibrating fin 82 extends from the container 81. Given that the container 81 and the housing 5 are formed as one member by fixing the housing 5 to the container 81, the vibrating fin 82 extends from the housing 5. The vibrating fin 82 is separated from the oscillator 4. The vibrating fin 82 is flat. In the state where the water stream generator 80 floats on water, the vibrating fin 82 extends perpendicular to the water surface.

The container 81 has a lower container 81a and an upper container 81b which can be separated from each other. The housing 5 of the one-dimensional vibration device 10 is fixed to the bottom surface of the lower container 81a.

A coating portion is formed on each surface of the oscillator 4 and the holding member 3 such that the oscillator 4 smoothly vibrates relative to the holding member 3. The vibrating fin 82 is made of an elastic material such as rubber, plastic, and wood.

The shape of the container 81 is preferably oval, cylindrical, spherical or streamlined so that resistance due to vibration in water is reduced. As a result, drag is reduced, thereby restricting attenuation of vibration of the water stream generator 80. The container 81 and the vibrating fin 82 serve as a device shaped like an artificial fish formed by attaching a caudal fin to an oval body. The center of gravity of the water stream generator 80 is located in the lower container 81a. Thus, in the state where the vibrating fin 82 is in water, the water stream generator 80 can float on water and be stabilized at a draft position.

The electromagnetic coil 1 generates a magnetic field in the direction perpendicular to the paper surface of FIG. 16. Since the holding member 3 is located on a side of the movement direction relative to the oscillator 4, the one-dimensional vibration device 10 and the container 81 vibrate in the direction perpendicular to the paper surface of FIG. 16. The vibration direction is perpendicular to a movement direction Q of the water stream generator 80.

The container 81 vibrates together with the housing 5, thereby vibrating the vibrating fin 82 extending from the container 81. The bottom of the vibrating fin 82 slightly vibrates as represented by arrow M1 in FIG. 16, and the front end of the vibrating fin 82 largely vibrates as represented by arrow M2. In this manner, the vibrations represented by arrows M1, M2 are each considered be flapping vibration having amplitude and rotational angle. As a result, since the vibrating fin 82 generates a water stream represented by arrow P, the whole water stream generator 80 swims toward arrow Q opposite to arrow P.

As compared to the general screw, the water stream generator 80 in FIG. 16 has the following advantages.

(30) Like a fish, the water stream generator 80 generates a water stream by vibration of the vibrating fin 82.

(31) The water stream generator 80 has a good waterproof property. For example, in the case of a screw propeller, power of a driving source accommodated in a body of a ship needs to be transmitted to blades located outside of the body of the ship through a rotary shaft as a power transmitting shaft. That is, a sealing member for sealing the rotary shaft passing through a wall of the body of the ship to the body of the ship is required. As commonly known, however, it is difficult to obtain perfect waterproof property due to age-related deterioration of the sealing member or lack in sealing pressure.

The water stream generator 80 in this embodiment has no rotary shaft passing through the container 81. Thus, while the vibrating fin 82 is disposed outside of the container 81, and the container 81 stores the one-dimensional vibration device 10 therein while ensuring perfect waterproof property. Vibration generated by the one-dimensional vibration device 10 only needs to be transmitted to the vibrating fin 82 through the housing 5 and the container 81. That is, the water stream generator 80 completely prevents water from entering the inside from the outside.

(32) Since the water stream generator 80 has no screw propeller blades and rotary shaft, the accident of being caught in the blades or shaft cannot occur. That is, the water stream generator 80 has a high degree of safety.

(33) Since the water stream generator 80 has a simple configuration and a good waterproof property, a breakdown hardly occurs, and the maintenance can be easily performed.

(34) In an experimental example of the water stream generator 80, by using a spherical neodymium magnet of 1 cm in diameter as the oscillator 4 and supplying electric power of about 2 W, an artificial fish device of about 10 cm in length and 50 g in weight was made as the water stream generator 80 and the device swam at the speed of about 30 cm/second.

The above-mentioned embodiments may be modified as follows.

Figure 17A:
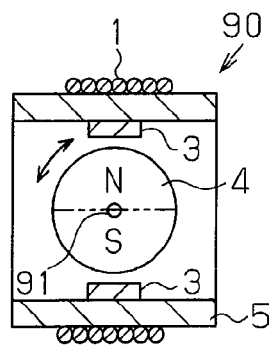
FIGS. 17A and 17B are a cross-sectional front view and a cross-sectional side view of a one-dimensional vibration device in accordance with a modified embodiment.
Figure 17B:
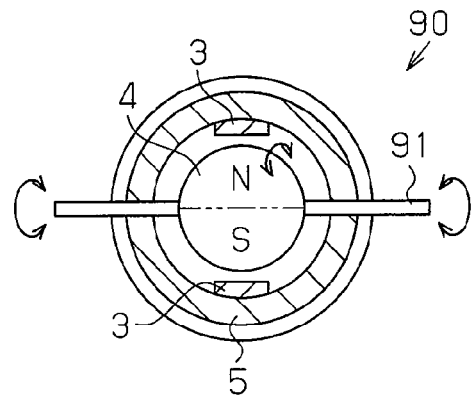

A vibration device 90 shown in FIGS. 17A and 17B has a rotary shaft 91 rotatably supported by the housing 5. The oscillator 4 rotates integrally with the rotary shaft 91. That is, the oscillator 4 can perform only rotational motion relative to the housing 5 and does not perform horizontal motion. The oscillator 4 under vibration repeats half turn. Since the rotary shaft 91 extends to the outside of the housing 5, vibration of the oscillator 4 can be transmitted to the outside of the housing 5.

Vibration of the center of gravity of the vibration device 90 is smaller than that of the one-dimensional vibration device 10 in FIG. 1A. The vibration device 90 has a pair of holding members 3 disposed so as to sandwich the oscillator 4 therebetween without contacting the oscillator 4. Since the holding members 3 act to keep the oscillator 4 at the stable position by the magnetic force emitted from the oscillator 4 as a magnet, the holding members 3 can hold the oscillator 4. In the case of the holding members 3 formed of magnetic bodies, when the magnetic force from the electromagnetic coil 1 is increased, the oscillator 4 can make a half turn or more. In the case of the holding members 3 formed of magnets, the oscillator 4 makes a half turn or less, and the oscillator 4 and the rotary shaft 91 tend to repeat stable rotation.

Figure 18A:
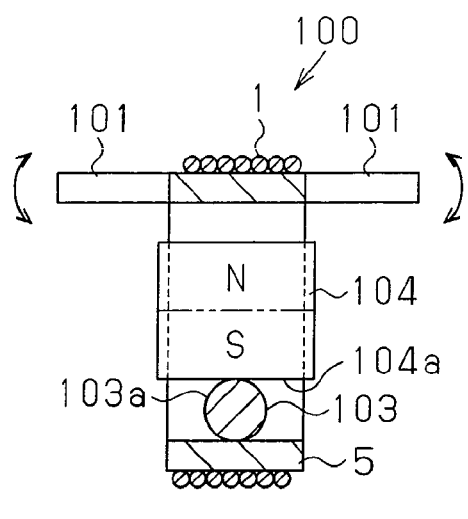
FIGS. 18A and 18B are a cross-sectional front view and a cross-sectional side view of a one-dimensional vibration device in accordance with another modified embodiment.
Figure 18B:
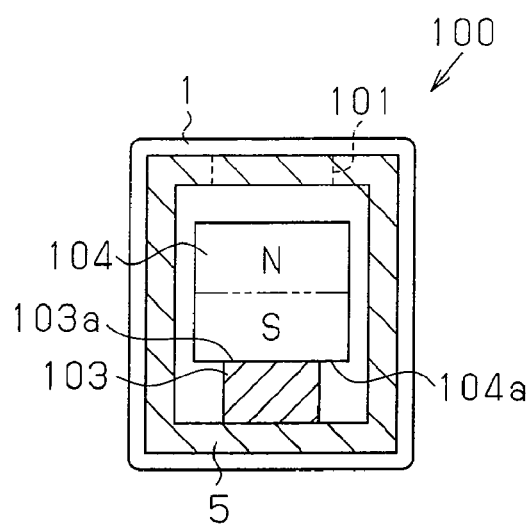

A vibration device 100 shown in FIGS. 18A and 18B has a pair of wings 101 extending from the housing 5. In place of the flat-plate like holding member 3, a cylindrical holding member 103 is disposed on the housing 5. In place of the spherical oscillator 4, a cylindrical oscillator 104 is disposed on the holding member 103.

The oscillator 104 is disposed so as to be circular when viewed from above in FIGS. 18A and 18B. That is, a bottom surface 104a of the cylindrical oscillator 104 is placed on a circumferential surface of the holding member 103. The bottom surface 104a of the oscillator 104 is a vibrating surface. The circumferential surface 103a of the holding member 103 is a holding surface. That is, in this embodiment, the flat vibrating surface vibrates relative to the holding surface as the circumferential surface. The oscillator 104 vibrates so as to repeatedly make a half turn or less along the circumference of the holding member 103. For this reason, the amplitude, that is, the rotational angle of the oscillator 104 is easy to be made large. As compared to the vibration device 90 in FIG. 17A, the vibration device 100 in FIG. 18A has a simple configuration without rotary shaft 91.

As shown in FIG. 18A, the wings 101 attached to the housing 5 convert vibration of the housing 5 into, for example, flapping of insects. As compared to the case where no wing 101 is provided, the vibration load L of the wings 101 lowers the number of proper vibration frequency of the oscillator 104 by the attraction magnetic force between the holding member 103 and the oscillator 104. Thus, the frequency of the driving current for resonating the vibration device 100 is set to be low. The wings 101 are not necessarily attached to the housing 5 and can be attached to the oscillator 104. However, by attaching the wings 101 to the housing 5, the sealing performance of the housing 5 can be improved.

To vibrate the oscillator 104 shown in FIG. 18A, the holding member 103 needs to be formed of a magnet and cannot be made of a nonmagnetic body. The reason is as follows. Since the bottom surface 104a of the cylindrical oscillator 104 is placed on the circumferential surface 103a of the cylindrical holding member 103 in unsupported manner, if the holding member 103 has no magnetism, a stable position at which the oscillator 104 contacts the holding member 103 is not determined. By forming the holding member 103 from the magnet, the stable position at which the bottom surface 104a of the oscillator 104 contacts the circumferential surface 103a of the holding member 103 is determined. Thus, the oscillator 104 is vibrated about the stable position.

Figure 19A:
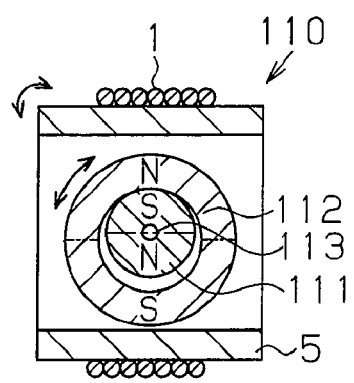
FIGS. 19A and 19B are a cross-sectional front view and a cross-sectional side view of a one-dimensional vibration device in accordance with yet another modified embodiment.
Figure 19B:
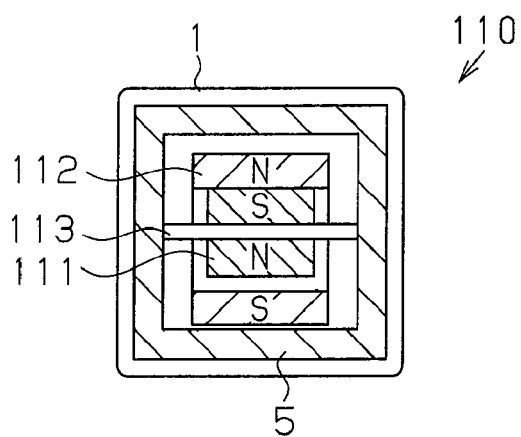

The vibration device 110 shown in FIGS. 19A and 19B has a cylindrical holding member 111 in place of the holding member 3 and a cylindrical oscillator 112 in place of the oscillator 4. The holding member 111 is supported to the housing 5 with a supporting shaft 113. The supporting shaft 113 and the holding member 111 are disposed inside the oscillator 112. That is, the supporting shaft 113 and the holding member 111 rotatably support the oscillator 112 to the housing 5. The inner circumference of the oscillator 112 can contact the outer circumference of the holding member 111. For example, when the south pole of the holding member 111 is located at the upper half and the north pole of the holding member 111 is located at the lower half, the state, where the north pole of the oscillator 112 is located at the upper half and the south pole of the oscillator 112 is located at the lower half, refers to the stable position of the oscillator 112. By supplying the pulse current to the electromagnetic coil 1, the oscillator 112 vibrates about the supporting shaft 113. The amplitude of the oscillator 112 reaches half turn of the oscillator 112 and the oscillator 112 vibrates so as to repeatedly make a half turn. Since the vibration device 110 in FIG. 19A incorporates the holding member 111 inside the oscillator 112, the vibration device 110 is suitable for miniaturization. Accordingly, the vibration of the center of gravity of the vibration device 110 is reduced.

The number of the two-dimensional vibration devices of the self-propelled apparatus is not limited to four as in the omnidirectional self-propelled apparatus 60 in FIG. 12A having four two-dimensional vibration devices 30, but may be, for example, two. For example, when the self-propelled apparatus has the first vibration device 61 and the third vibration device 63, the control modes No. 11, No. 12, No. 19, and No. 20 in FIG. 13 are plausible. That is, the self-propelled apparatus having two two-dimensional vibration devices 30 moves in the two directions of forward movement/rearward movement and rotates.

The periodic current supplied to the one-dimensional vibration device 10 in FIG. 1A and the two-dimensional vibration device 30 in FIG. 6 is not limited to a pulse current repeatedly turned ON and OFF, but can be, for example, a sinusoidal current in which positive current and negative current are alternately switched to each other.

The combination of the holding surface 3a of the holding member 3 and the vibrating surface 4a of the oscillator 4 in FIGS. 1A and 6B in shape is not limited to a flat surface and a spherical surface, but can be a flat surface and a curved surface, a curved surface and a flat surface, or a curved surface and a curved surface. The shape of holding surface 3a and the vibrating surface 4a should be appropriately changed according to uses.

The invention claimed is:

1. A vibration generator comprising:
   an oscillator including a permanent magnet generating a stationary magnetic field;
   a holding member for holding the oscillator based on a static magnetic force due to the stationary magnetic field between the oscillator and the holding member, the holding member including a permanent magnet or a magnetic body, so that the holding member holds the oscillator at a stable position due to the static magnetic force, the oscillator being capable of vibrating relative to the holding member about the stable position, the static magnetic force defining a resonance period of vibration of the oscillator about the stable position relative to the holding member; and
   an electromagnetic coil fixed to the holding member, wherein, when a periodic current is not supplied to the electromagnetic coil, the oscillator remains stationary at the stable position, when the periodic current is supplied to the electromagnetic coil, the oscillator vibrates about the stable position relative to the holding member so as to synchronize with the period of the periodic current, and resonates by synchronizing the period of the periodic current with the resonance period.

2. The vibration generator according to claim 1, further comprising a manual control circuit for controlling the period of the periodic current by a manual operation to resonate the oscillator,
   wherein the manual control circuit includes:
   an oscillating circuit for generating a basic signal having a basic frequency;
   a driving circuit for generating the periodic current based on the basic signal; and
   a manually-operable variable resistance or a variable capacitor for changing the basic frequency.

3. The vibration generator according to claim 1, further comprising an autonomous control circuit for autonomously controlling the period of the periodic current to resonate the oscillator,
   wherein the autonomously control circuit includes:
   an oscillating circuit for generating a basic signal having a basic frequency;
   a frequency dividing circuit for dividing the basic frequency by a number represented by n to generate a divided frequency;
   a driving circuit for generating the periodic current based on the divided frequency;
   a measuring portion that measures vibration of the oscillator and generates a measurement result; and
   an optimum frequency determining circuit for determining a value of the number n, thereby resonating the oscillator based on the measurement result and the divided frequency.

4. The vibration generator according to claim 1, wherein the electromagnetic coil is one of a first electromagnetic coil and a second electromagnetic coil, which are wound intersecting to each other so as to be fixed to the holding member, and
   wherein, by controlling a first periodic current supplied to the first electromagnetic coil and a second periodic current supplied to the second electromagnetic coil, the vibration direction of the oscillator in the resonated state can be varied to any straight line direction and to any elliptic direction on a two-dimensional plane.

5. The vibration generator according to claim 4, further comprising a manual control circuit for controlling the first periodic current and the second periodic current through a manual operation to resonate the oscillator,
   wherein the manual control circuit includes:
   an oscillating circuit for generating a basic signal having a basic frequency;
   a phase shift circuit for generating a plurality of phase signals which are each shifted from the basic frequency in phase;
   a first driving portion for generating the first periodic current based on a first phase signal of the plurality of the phase signals;
   a second driving portion for generating the second periodic current based on a second phase signal of the plurality of the phase signals; and
   a manually-operable variable resistance or a variable capacitor for changing the basic frequency.

6. The vibration generator according to claim 4, further comprising an autonomous control circuit for autonomously controlling the first periodic current and the second periodic current to resonate the oscillator,
   wherein the autonomous control circuit includes:
   an oscillating circuit for generating a basic signal having a basic frequency;
   a frequency dividing circuit for dividing the basic frequency by a number represented by n to generate a divided frequency;
   a phase shift circuit for generating a plurality of phase signals which are each shifted from the basic frequency in phase;
   a first driving portion for generating the first periodic current based on a first phase signal of the plurality of the phase signals;
   a second driving portion for generating the second periodic current based on a second phase signal of the plurality of the phase signals;
   a two-dimensional measuring portion, which detects vibration of the oscillator in a two-dimensional direction and generates a measurement result; and
   an optimum frequency determining circuit for determining a value of the number n, thereby resonating the oscillator based on the measurement result and the divided frequency.

7. The vibration generator according to claim 1, further comprising:
   a housing for accommodating the oscillator and the holding member therein, wherein the electromagnetic coil is wound around the housing;
   a leg for supporting the housing relative to a reference surface in a vibratable manner; and a transport plate mounted on the housing, wherein, by resonating the oscillator, the housing vibrates due to reaction to the vibration of the oscillator, and as a result, an article to be transported mounted on the transport plate is transported.

8. The vibration generator according to claim 7, further comprising a vibration converting portion for transmitting vibration of the housing to the transport plate, the vibration converting portion being disposed on an opposite side of the oscillator with respect to the transport direction of the transported article.

9. The vibration generator according to claim 4, further comprising:
- a housing for accommodating the oscillator and the holding member therein, wherein the first electromagnetic coil and the second electromagnetic coil are wound around the housing;
- an elastic enclosure part for enclosing the housing in a vibratable manner;
- a leg for supporting the elastic enclosure in a vibratable manner relative to a reference surface; and
- a transport plate mounted on the housing, wherein, by resonating the oscillator, the housing vibrates due to reaction to the vibration of the oscillator, and as a result, an article to be transported mounted on the transport plate is transported in a direction selected from two directions.

10. The vibration generator according to claim 9, wherein the oscillator is set so as to vibrate perpendicularly to the reference surface and along a flat surface extending in the transport direction of the transported article.

11. The vibration generator according to claim 4, further comprising:
- a plurality of sets of the oscillator, the holding member, the first electromagnetic coil, and the second electromagnetic coil, and
- an elastic enclosure for enclosing each the oscillator in a vibratable manner, wherein, by controlling the vibration direction of a plurality of the oscillators, the elastic enclosure moves on the reference surface in multiple directions and rotated so as to turn around at the current position.

12. The vibration generator according to claim 11, wherein a plurality of the oscillators include four oscillators disposed at four positions on the reference surface, and wherein, by arranging each of the oscillators and the holding members along the reference surface and independently controlling the vibration directions of the four oscillators, the elastic enclosure moves on the reference surface in all directions and rotated so as to turn around at the current position.

13. The vibration generator according to claim 11, further comprising a leg for supporting the elastic enclosure in a vibratable manner relative to the reference surface, wherein the housing vibrates together with the oscillator, thereby transporting or rotating an article to be transported mounted on the elastic enclosure.

14. The vibration generator according to claim 13, wherein a plurality of sets of the oscillators and the holding members are collectively disposed on the reference surface in a matrix.

15. The vibration generator according to claim 1, further comprising:
- a housing for accommodating the oscillator and the holding member therein, the electromagnetic coil is wound around the housing; and
- a vibrating fin which extends from the housing and is separated from the oscillator, wherein, by resonating the oscillator, the housing and the vibrating fin also vibrate due to reaction to the vibration of the oscillator.

16. The vibration generator according to claim 15, wherein the vibrating fin disposed in water vibrates, thereby generating a water stream.

17. The vibration generator according to claim 1, wherein the holding member has a holding surface, the oscillator can rotate or move on the holding surface and has a vibrating surface which contacts the holding surface, and wherein the vibrating surface is a flat surface or a curved surface and the holding surface is a curved surface or a flat surface.

18. The vibration generator according to claim 17, wherein the vibrating surface is a spherical surface and the holding surface is a flat surface opposed to the oscillator.

19. The vibration generator according to claim 17, wherein the vibrating surface is a spherical surface, the holding surface is a convex surface opposed to the oscillator, and the oscillator can rotate and move so as to vibrate about the top of the convex of the holding surface.

20. The vibration generator according to claim 1, wherein the electromagnetic coil is formed to vibrate the oscillator in a direction different from a direction of the static magnet force between the oscillator and the holding member.

* * * * *